(12) United States Patent
Dudar et al.

(10) Patent No.: US 11,187,192 B2
(45) Date of Patent: Nov. 30, 2021

(54) SYSTEMS AND METHODS FOR CONDUCTING VEHICLE EVAPORATIVE EMISSIONS TEST DIAGNOSTIC PROCEDURES

(71) Applicant: Ford Global Technologies, LLC, Dearborn, MI (US)

(72) Inventors: Aed M. Dudar, Canton, MI (US); Mark Peters, Wolverine Lake, MI (US); Dennis Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 487 days.

(21) Appl. No.: 15/894,655

(22) Filed: Feb. 12, 2018

(65) Prior Publication Data
US 2019/0249622 A1  Aug. 15, 2019

(51) Int. Cl.
*F02M 25/08* (2006.01)
*F02M 37/00* (2006.01)
(Continued)

(52) U.S. Cl.
CPC ....... *F02M 25/0818* (2013.01); *B60K 15/035* (2013.01); *B60K 15/03504* (2013.01);
(Continued)

(58) Field of Classification Search
CPC ............... F02D 41/22; F02D 2041/225; F02D 2200/0602; F02D 2200/703; F02M 25/0854
See application file for complete search history.

(56) References Cited

U.S. PATENT DOCUMENTS 5,765,121 A * 6/1998 Schwager .......... F02M 25/0809
701/104
6,367,458 B1 * 4/2002 Furusho ............. F02M 25/0809
123/198 D
(Continued)

OTHER PUBLICATIONS

Dudar, A., "Systems and Methods for Diagnosing a Vehicle Fuel System and Evaporative Emissions Control System," U.S. Appl. No. 15/670,665, filed Aug. 7, 2017, 91 pages.
(Continued)

*Primary Examiner* — Redhwan K Mawari
(74) *Attorney, Agent, or Firm* — Geoffrey Brumbaugh; McCoy Russell LLP

(57) ABSTRACT

Methods and systems are provided for conducting diagnostics to indicate whether a fuel system and/or an evaporative emissions system of a vehicle has a source of undesired evaporative emissions, or not. A method comprises conducting such a diagnostic via evacuating the fuel system to a target vacuum, then sealing the fuel system from atmosphere and monitoring a pressure bleed-up in the fuel system, and dynamically adjusting a pressure bleed-up threshold responsive to one or more conditions that impact the pressure bleed-up during the diagnostic, and indicating undesired evaporative emissions responsive to the pressure bleed-up reaching the adjusted pressure bleed-up threshold. In this way, interpretation of the results of such a diagnostic may be more robust, completion rates may improve, and engine operation may be improved.

11 Claims, 11 Drawing Sheets

(51) Int. Cl.
*G06N 20/00* (2019.01)
*B60K 15/035* (2006.01)
B60K 15/03 (2006.01)
G01C 21/34 (2006.01)

(52) U.S. Cl.
CPC ..... *B60K 15/03519* (2013.01); *F02M 25/089* (2013.01); *F02M 37/0082* (2013.01); *G06N 20/00* (2019.01); *B60K 15/03* (2013.01); *B60K 2015/0358* (2013.01); *B60K 2015/03217* (2013.01); *B60K 2015/03486* (2013.01); *B60K 2015/03514* (2013.01); *B60Y 2200/92* (2013.01); *G01C 21/34* (2013.01); *Y10S 903/903* (2013.01)

(56) References Cited

U.S. PATENT DOCUMENTS

| | | | | |
|---|---|---|---|---|
| 7,089,920 | B2 * | 8/2006 | Nakoji | F02M 25/0809 |
| | | | | 123/198 D |
| 2004/0099249 | A1 * | 5/2004 | Lee | F02D 41/064 |
| | | | | 123/464 |
| 2005/0257775 | A1 * | 11/2005 | Kojima | F02M 59/102 |
| | | | | 123/458 |
| 2010/0250096 | A1 * | 9/2010 | Yamada | F02D 41/3809 |
| | | | | 701/103 |
| 2014/0277927 | A1 * | 9/2014 | Guo | F02M 25/0818 |
| | | | | 701/34.4 |
| 2014/0297071 | A1 * | 10/2014 | Dudar | F02D 41/22 |
| | | | | 701/22 |
| 2015/0198103 | A1 * | 7/2015 | Dudar | F02M 25/0809 |
| | | | | 701/102 |
| 2015/0198123 | A1 * | 7/2015 | Pearce | F02M 25/0809 |
| | | | | 123/520 |
| 2016/0290286 | A1 * | 10/2016 | Dudar | F02M 25/089 |
| 2017/0152798 | A1 * | 6/2017 | Casetti | F02M 25/0854 |
| 2017/0292475 | A1 * | 10/2017 | Dudar | F02D 41/0037 |
| 2018/0274461 | A1 * | 9/2018 | Ujihara | B60W 30/045 |
| 2018/0283233 | A1 * | 10/2018 | Kachi | F02D 41/221 |
| 2019/0017458 | A1 * | 1/2019 | Ham | F02D 41/22 |
| 2019/0040812 | A1 * | 2/2019 | Sarwar | F02D 41/062 |
| 2019/0186392 | A1 * | 6/2019 | Dudar | F02M 25/0836 |
| 2019/0249622 | A1 * | 8/2019 | Dudar | F02M 25/0818 |

OTHER PUBLICATIONS

Dudar, A. et al., "Systems and Methods for Vehicle Fuel System and Evaporative Emissions System Diagnostics," U.S. Appl. No. 15/844,910, filed Dec. 18, 2017, 129 pages.

* cited by examiner

FIG. 4

| Canister loading state | ≤ 40F | 41F-49F | 50F-59F | 60F-69F | 70F-79F | 80F-89F | ≥90F |
|---|---|---|---|---|---|---|---|
| >90% | -16InH2O | -12InH2O | -8InH2O | - | - | - | - |
| 76%-90% | -20InH2O | -16InH2O | -12InH2O | -8InH2O | -8InH2O | - | - |
| 61%-75% | -20InH2O | -16InH2O | -16InH2O | -12InH2O | -8InH2O | -8InH2O | - |
| 46%-60% | -24InH2O | -20InH2O | -16InH2O | -16InH2O | -12InH2O | -12InH2O | -8InH2O |
| 31%-45% | -24InH2O | -20InH2O | -20InH2O | -20InH2O | -16InH2O | -12InH2O | -12InH2O |
| 16%-30% | -28InH2O | -24InH2O | -24InH2O | -20InH2O | -20InH2O | -16InH2O | -16InH2O |
| <15% | -28InH2O | -28InH2O | -28InH2O | -24InH2O | -24InH2O | -20InH2O | -20InH2O |

Ambient Temperature

400

SYSTEMS AND METHODS FOR CONDUCTING VEHICLE EVAPORATIVE EMISSIONS TEST DIAGNOSTIC PROCEDURES

FIELD

The present description relates generally to methods and systems for controlling a vehicle engine to adjust thresholds for determining a presence or absence of undesired evaporative emissions stemming from a vehicle fuel system and/or evaporative emissions system.

BACKGROUND/SUMMARY

Vehicle evaporative emissions control systems may be configured to store fuel vapors from fuel tank refueling and diurnal engine operations, and then purge the stored vapors during a subsequent engine operation. The fuel vapors may be stored in a fuel vapor canister, for example. In an effort to meet stringent federal emissions regulations, emission control systems may need to be intermittently diagnosed for the presence of sources of undesired evaporative emissions that may release fuel vapors to the atmosphere.

One method of testing for the presence of undesired evaporative emissions in a fuel system and/or emission control system may include applying a vacuum to the fuel system and/or evaporative emissions system that is otherwise sealed. An absence of gross undesired evaporative emissions may be indicated if a threshold vacuum is met. In some examples, the fuel system and/or evaporative emissions system may be sealed subsequent to the threshold vacuum being reached, and an absence of non-gross undesired evaporative emissions may be indicated if a pressure bleed-up is less than a bleed-up threshold, or if a rate of pressure bleed-up is less than a bleed-up rate threshold. Failure to meet these criteria may indicate the presence of non-gross undesired evaporative emissions in the fuel system and/or evaporative emissions system. In some examples, an intake manifold vacuum may be used as the vacuum source applied to the emissions control system. However, hybrid-electric vehicles (HEVs) have limited engine run time, and may thus have limited opportunities to perform such a test. Further, in order to improve fuel efficiency, vehicles may be configured to operate with a low manifold vacuum, and may thus have limited opportunities with sufficient vacuum to perform such tests for undesired evaporative emissions.

Thus, to meet emissions regulations, such vehicles may include an on-board vacuum pump, which may be included in an evaporative leak check module (ELCM). The ELCM may be coupled to the evaporative emissions system, within a canister vent line, for example. The ELCM may thus supply the vacuum for appropriate tests. However, installing an ELCM in a vehicle is a relatively expensive manufacturing cost, which increases in correlation to evaporative emissions system and fuel tank volume. Thus, it may be desirable to improve upon the methodology for evacuating the fuel system and/or evaporative emissions system, such that costs may be reduced. The inventors have herein recognized these issues.

Furthermore, there may be circumstances where the pressure bleed-up test for the presence or absence of non-gross undesired evaporative emissions may be adversely impacted due to environmental or vehicle operating conditions. Specifically, bleed-up may be influenced by ambient temperature, fuel temperature, fuel volatility, fuel slosh, presence or absence of rain or puddle conditions that may cool the fuel system and/or evaporative emissions system, altitude changes, etc., thus making interpretation of the results of such a test challenging. For example, if a fuel system is evacuated to a target of −8 InH2O, but due to fuel vaporization as a result of high ambient temperature, 2-3 InH2O of vacuum are lost, then the results of such a test may be inconclusive as it may be challenging to interpret whether the bleed-up is due to the presence of a source of undesired evaporative emissions, or due to fuel vaporization. The inventors have herein recognized these issues.

Thus, the inventors have herein developed systems and methods address the above-mentioned issues. In one example, a method comprises conducting a diagnostic via evacuating a vehicle fuel system to a target vacuum, then sealing the fuel system from atmosphere and monitoring a pressure bleed-up in the fuel system. The method further includes dynamically adjusting a pressure bleed-up threshold responsive to one or more conditions that impact the pressure bleed-up during the diagnostic, and indicating undesired evaporative emissions responsive to the pressure bleed-up reaching the adjusted pressure bleed-up threshold. In this way, results of such a diagnostic may be correctly interpreted, which may improve engine operation and lifetime, and which reduce release of undesired evaporative emissions to atmosphere over time.

As an example, the method may further comprise a controller to conduct the diagnostic and the dynamic adjustment of the pressure bleed-up threshold. Prior to conducting the diagnostic, the method may include learning, via the controller, the one or more conditions that impact the pressure bleed-up.

In one example, learning the one or more conditions that impact the pressure bleed-up may include learning a reid vapor pressure of fuel stored in the fuel system.

In another example, learning the one or more conditions that impact the pressure bleed-up may further comprise learning routes commonly traveled via the vehicle, and wherein the one or more conditions include fuel slosh events in the fuel system and/or altitude changes greater than a threshold altitude change along routes commonly traveled via the vehicle.

In some examples, the target vacuum may comprise a variable target vacuum, variable as a function of the one or more conditions that impact the pressure bleed-up. The target vacuum may further be a function of one or more of ambient temperature, a fuel level of fuel stored in a fuel tank of the fuel system, and/or a loading state of a fuel vapor storage canister that traps and stores fuel vapors stemming from the fuel system.

In another example, evacuating the fuel system to the target vacuum further comprises evacuating an evaporative emissions system to the target vacuum, the evaporative emissions system selectively fluidically coupled to the fuel system. In such an example, sealing the fuel system from atmosphere and monitoring the pressure bleed-up may further include sealing the evaporative emissions system from atmosphere, monitoring pressure bleed-up in the fuel system and evaporative emissions system, and indicating undesired evaporative emissions responsive to the pressure bleed-up reaching the pressure bleed-up threshold. In such an example, the method may further include sealing the fuel system from the evaporative emissions system upon sealing the fuel system and the evaporative emissions system from atmosphere, where monitoring the pressure bleed-up includes monitoring a fuel system pressure bleed-up and an evaporative emissions system pressure bleed-up independently of each other, and wherein indicating undesired evaporative emissions includes indicating a presence or absence of undesired evaporative emissions independently for the fuel system and for the evaporative emissions system. In such an example, the pressure bleed-up is dynamically adjusted independently for the fuel system and the evaporative emissions system.

In still another example of the method, the one or more conditions may include a sudden pressure decrease while monitoring the pressure bleed-up, where the sudden pressure decrease corresponds to the fuel system being rapidly cooled.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 depicts an example lookup table that includes information corresponding to maximal levels of vacuum to apply to a fuel system and/or evaporative emissions system as a function of ambient temperature and canister loading state.

DETAILED DESCRIPTION

The following description relates to systems and methods for diagnosing a presence or absence of undesired evaporative emissions stemming from a vehicle fuel system and/or evaporative emissions system. Such methods may be conducted in a hybrid vehicle, such as the vehicle depicted at FIG. 1, but may in other examples be conducted in a non-hybrid vehicle. The fuel system and evaporative emissions system of such a vehicle are depicted at FIG. 2, coupled to an engine system. The presence or absence of undesired evaporative emissions may be indicated responsive to an evaporative emissions test diagnostic that includes a portion of the test where the fuel system and/or evaporative emissions system are evacuated, and another portion of the test where the fuel system and/or evaporative emissions system are sealed, and pressure bleed-up monitored in order to indicate whether a source of undesired evaporative emissions is stemming from the fuel system and/or evaporative emissions system. The pressure bleed-up portion may in some examples be impacted by one or more conditions, which may complicate interpretation of the results of the diagnostic. Thus, it may be desirable to dynamically adjust pressure bleed-up threshold(s) for such tests, as a function of the one or more conditions that may impact pressure bleed-up. To do so, signal-to-noise for such tests has to be such that the thresholds can be reasonably adjusted. It is herein recognized that the signal-to-noise may be increased by varying a level of vacuum applied on the fuel system and evaporative emissions system during the evacuation portion of the test (e.g. applying a deeper or more negative vacuum than a basal vacuum), such that the pressure thresholds may be adjusted.

Figure 3:
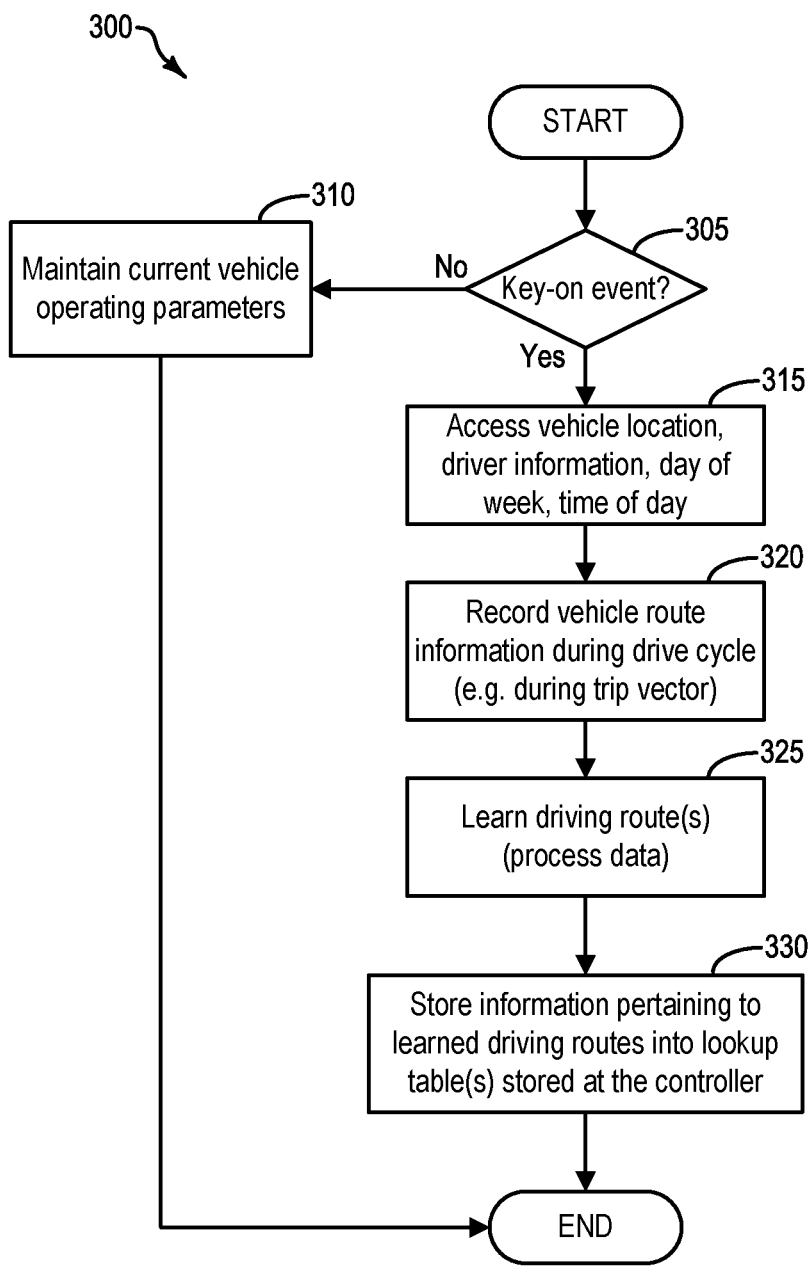
FIG. 3 depicts a high-level example method for learning routes commonly traveled by a vehicle.
Figure 5:
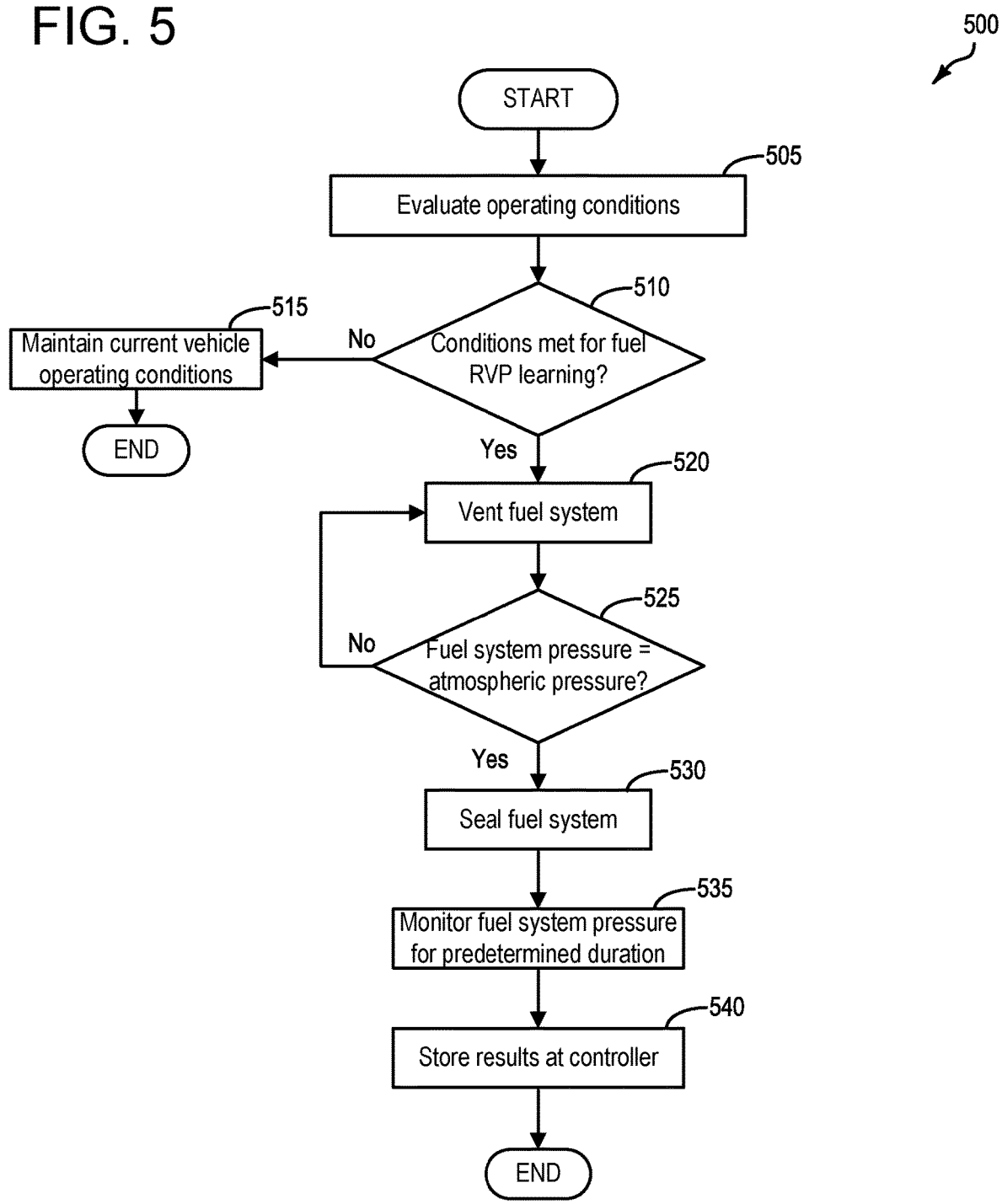
FIG. 5 depicts a high-level example method for learning a reid vapor pressure of fuel stored in a fuel system of the vehicle.
Figure 6:
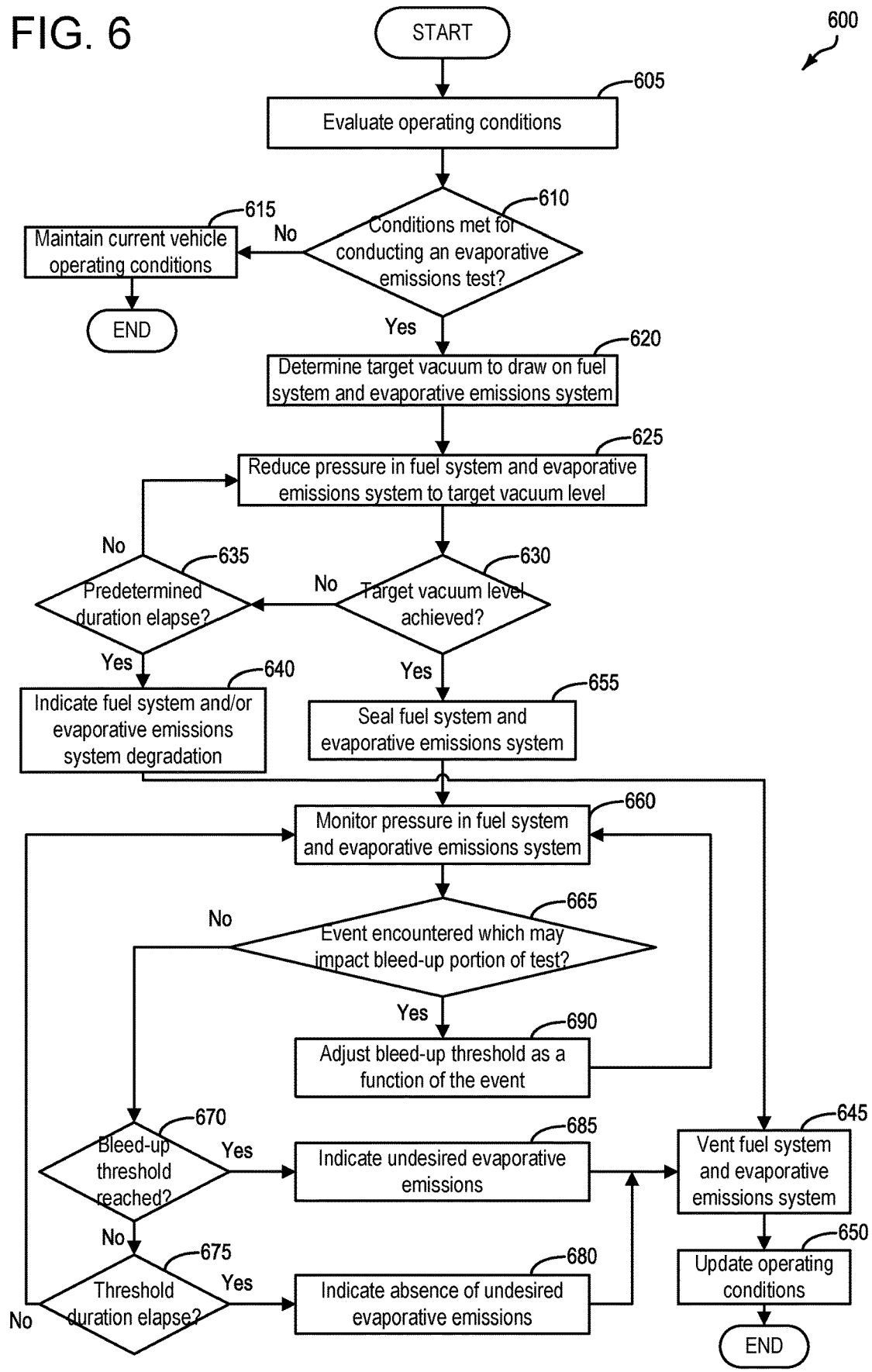
FIG. 6 depicts a high-level example method for conducting an evaporative emissions test diagnostic on the fuel system and/or evaporative emissions system.
Figure 7:
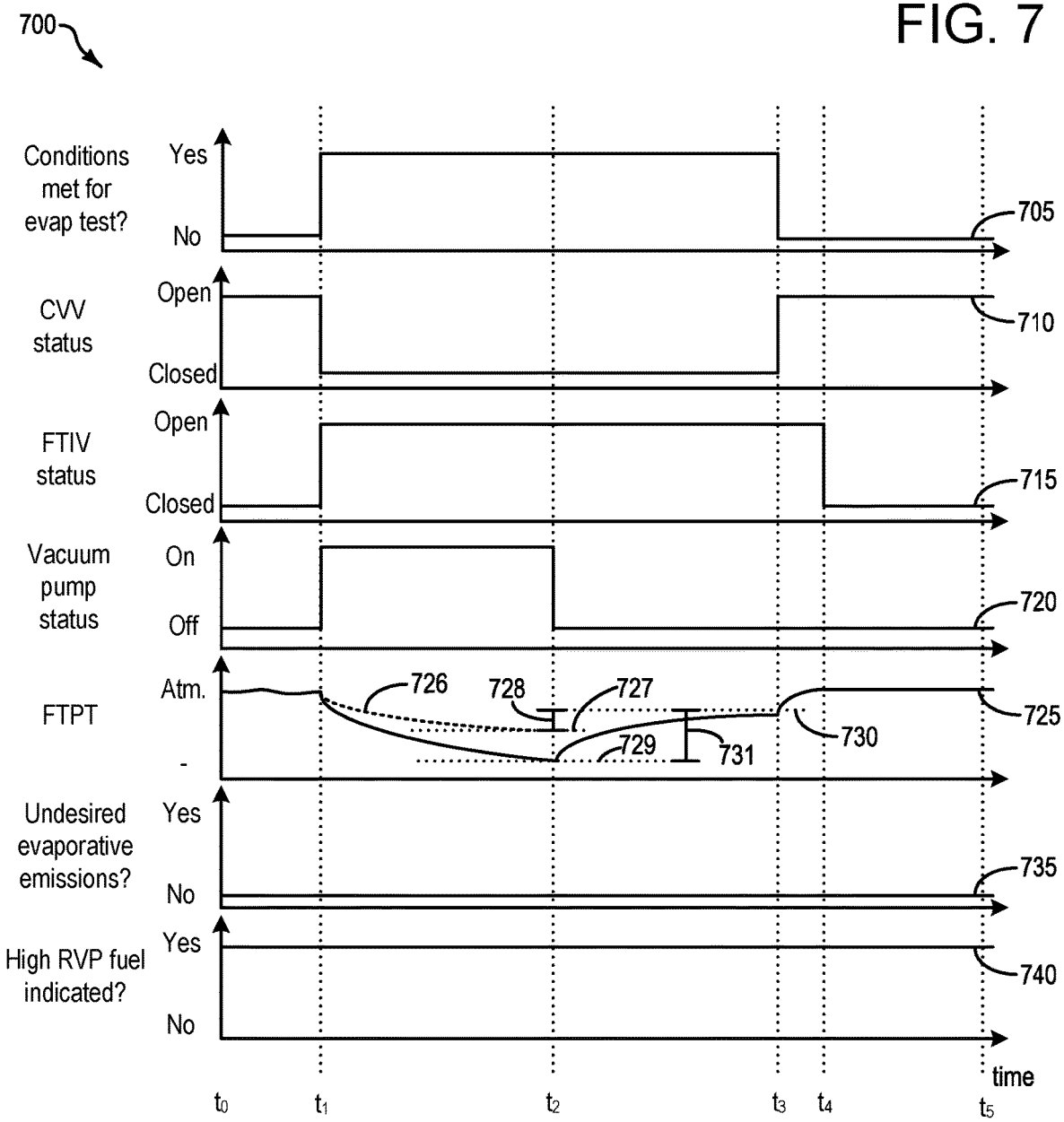
FIG. 7 depicts an example timeline for conducting the evaporative emissions test diagnostic of FIG. 6 under conditions where high reid vapor pressure fuel is identified.
Figure 8:
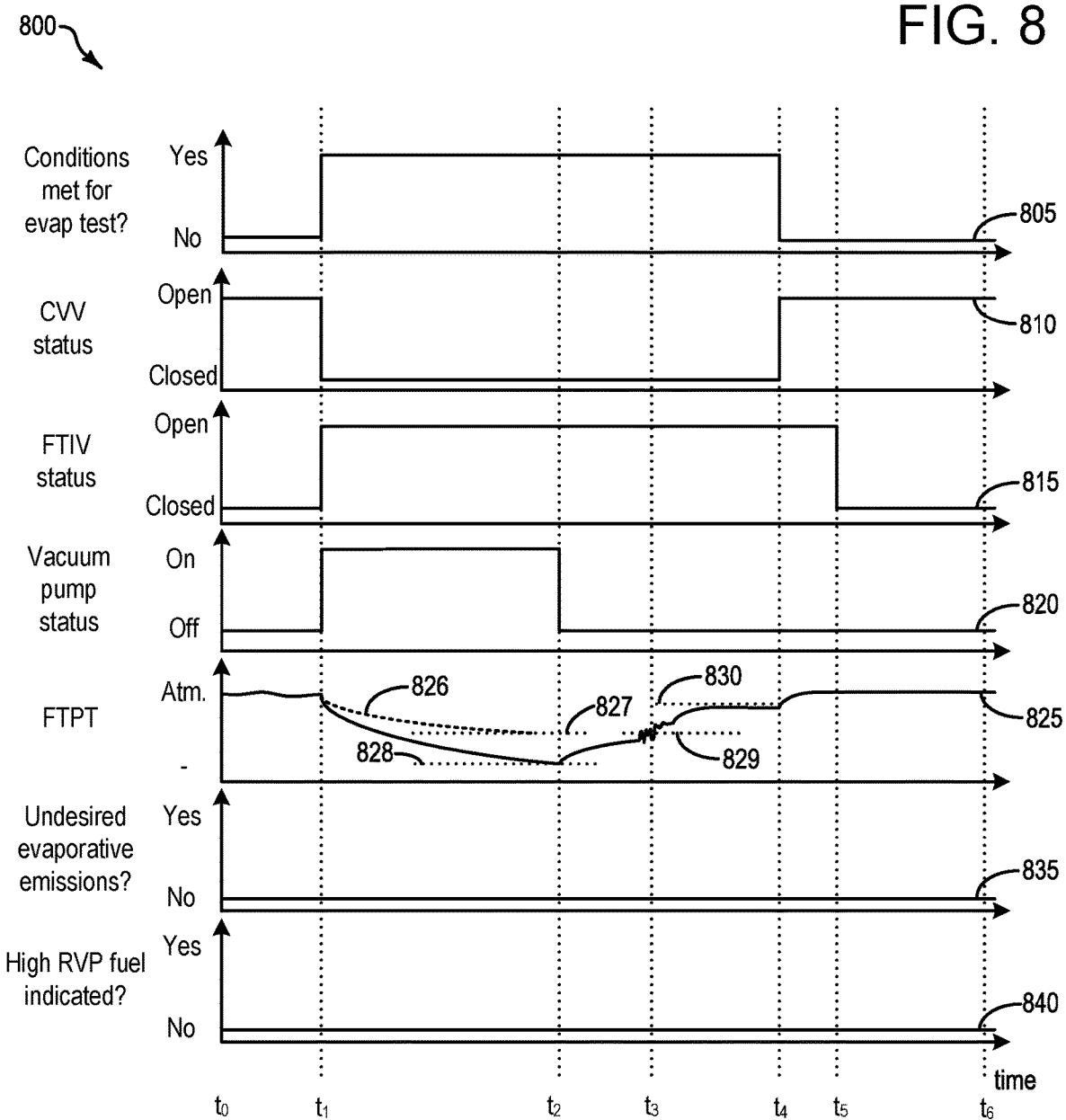
FIG. 8 depicts an example timeline for conducting the evaporative emissions test diagnostic of FIG. 6 under conditions where one or more fuel slosh events occur during a pressure bleed-up portion of the test.
Figure 9:
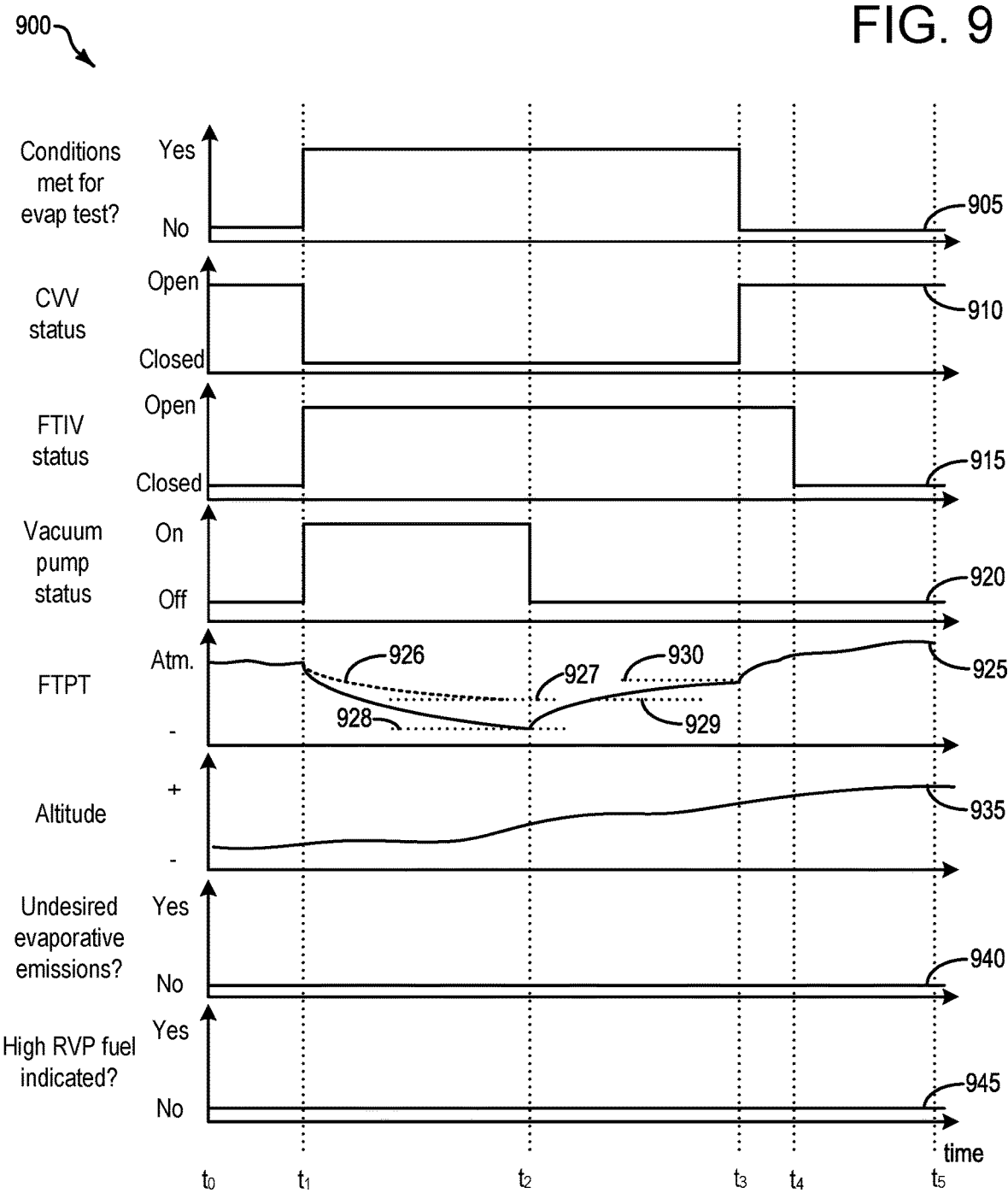
FIG. 9 depicts an example timeline for conducting the evaporative emissions test diagnostic of FIG. 6 under conditions where an altitude change occurs during the pressure bleed-up portion of the test.
Figure 10:
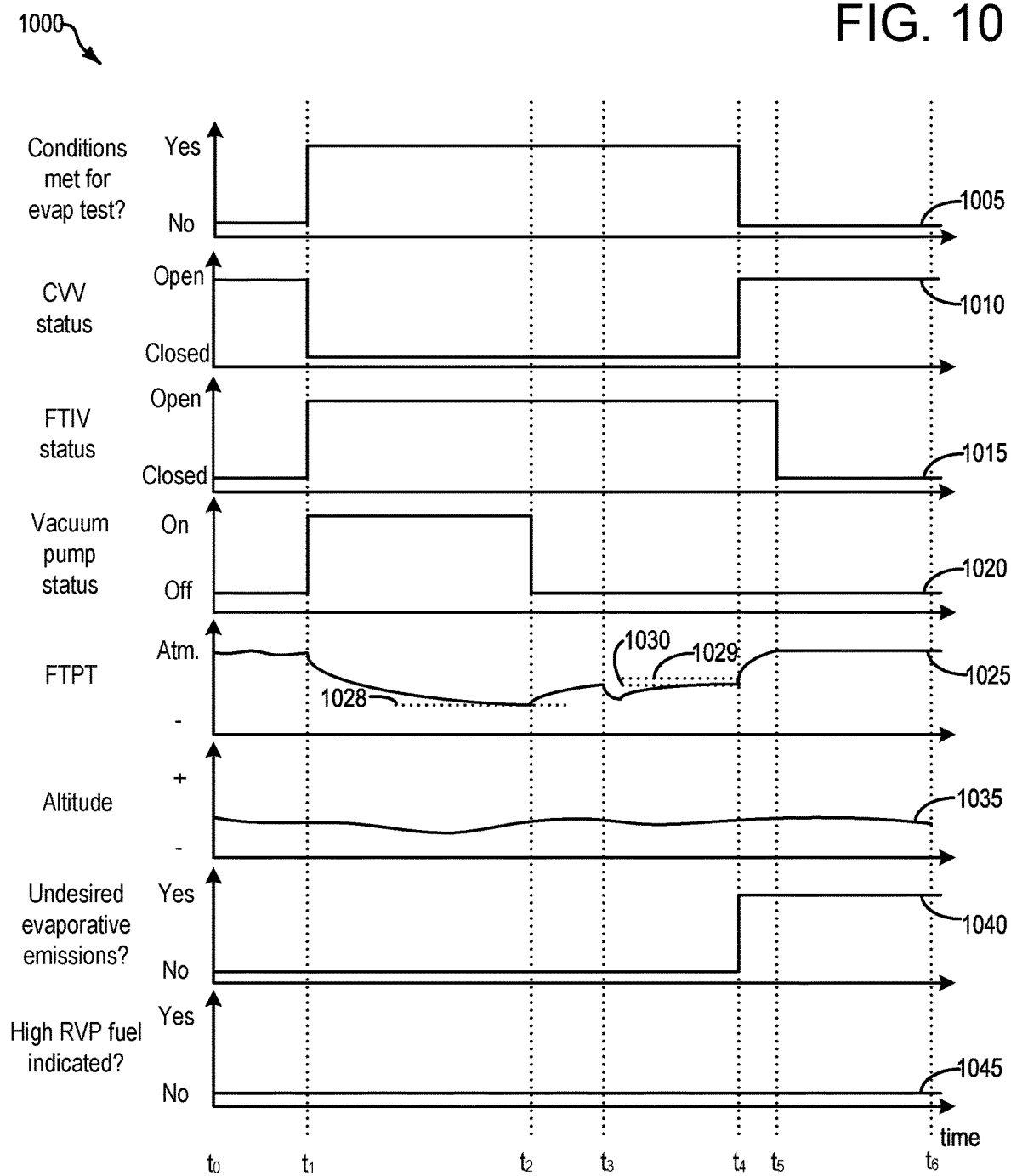
FIG. 10 depicts an example timeline for conducting the evaporative emissions test diagnostic of FIG. 6 under conditions where the fuel system and/or evaporative emissions system is rapidly cooled during the pressure bleed-up portion of the test.
Figure 11:
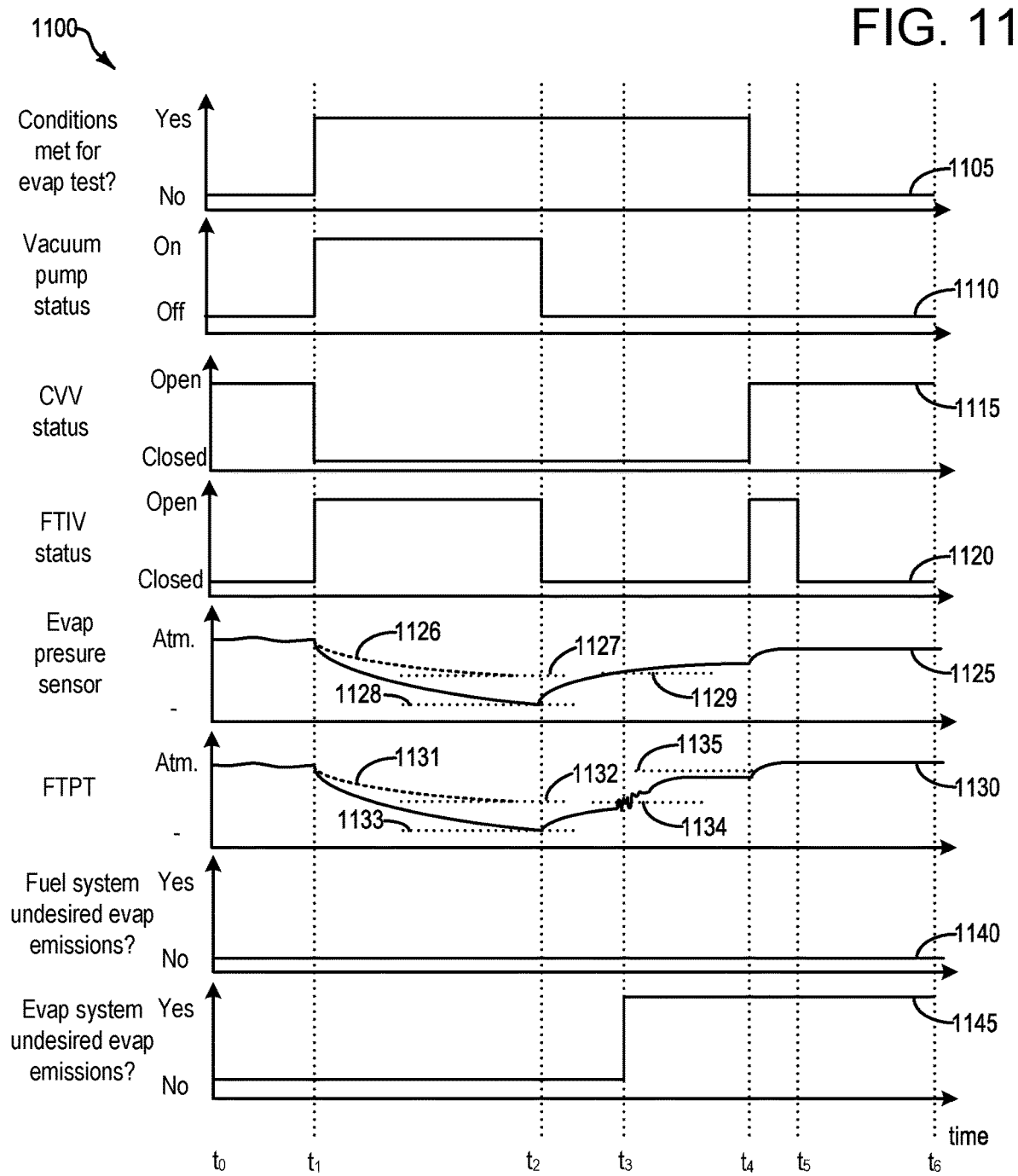
FIG. 11 depicts an example timeline for conducting the evaporative emissions test diagnostic of FIG. 6 where the fuel system is sealed from the evaporative emissions system during the diagnostic.

The variable vacuum may be dependent on conditions learned or predicted to potentially occur during the pressure bleed-up portion of the test. Accordingly, FIG. 3 depicts a method for learning routes commonly traveled via the vehicle. The variable vacuum may in some examples be dependent on ambient temperature and canister loading state, illustrated by the lookup table depicted at FIG. 4. The variable vacuum may in some examples be a function of fuel reid vapor pressure (RVP), and accordingly FIG. 5 depicts a method for learning fuel RVP prior to conducting the evaporative emissions test diagnostic. A method for conducting the evaporative emissions diagnostic that includes a variable vacuum target, and dynamically adjusting pressure bleed-up thresholds as a function of learned/predicted conditions that may impact the pressure bleed-up portion of the test, is illustrated at FIG. 6. FIG. 7 depicts an example timeline for conducting such a test where high RVP fuel is indicated to be stored in the fuel system. FIG. 8 depicts an example timeline for conducting such a test where one or more fuel slosh events are predicted/learned to occur during the pressure bleed-up portion of the test. FIG. 9 depicts an example timeline for conducting such a test where an altitude change is learned/predicted to occur during the pressure bleed-up portion of the test. FIG. 10 depicts an example timeline for conducting such a test where weather conditions (e.g. rain/puddle conditions) impact the pressure bleed-up portion of the test. Timelines illustrated at FIGS. 7-10 include situations where the fuel system and evaporative emissions system are fluidically coupled during the pressure bleed-up portion of the test. Alternatively, FIG. 11 depicts an example timeline where the fuel system and evaporative emissions system are sealed from one another during the pressure bleed-up portion of the evaporative emissions test, such that each system may be independently diagnosed.

Figure 1:
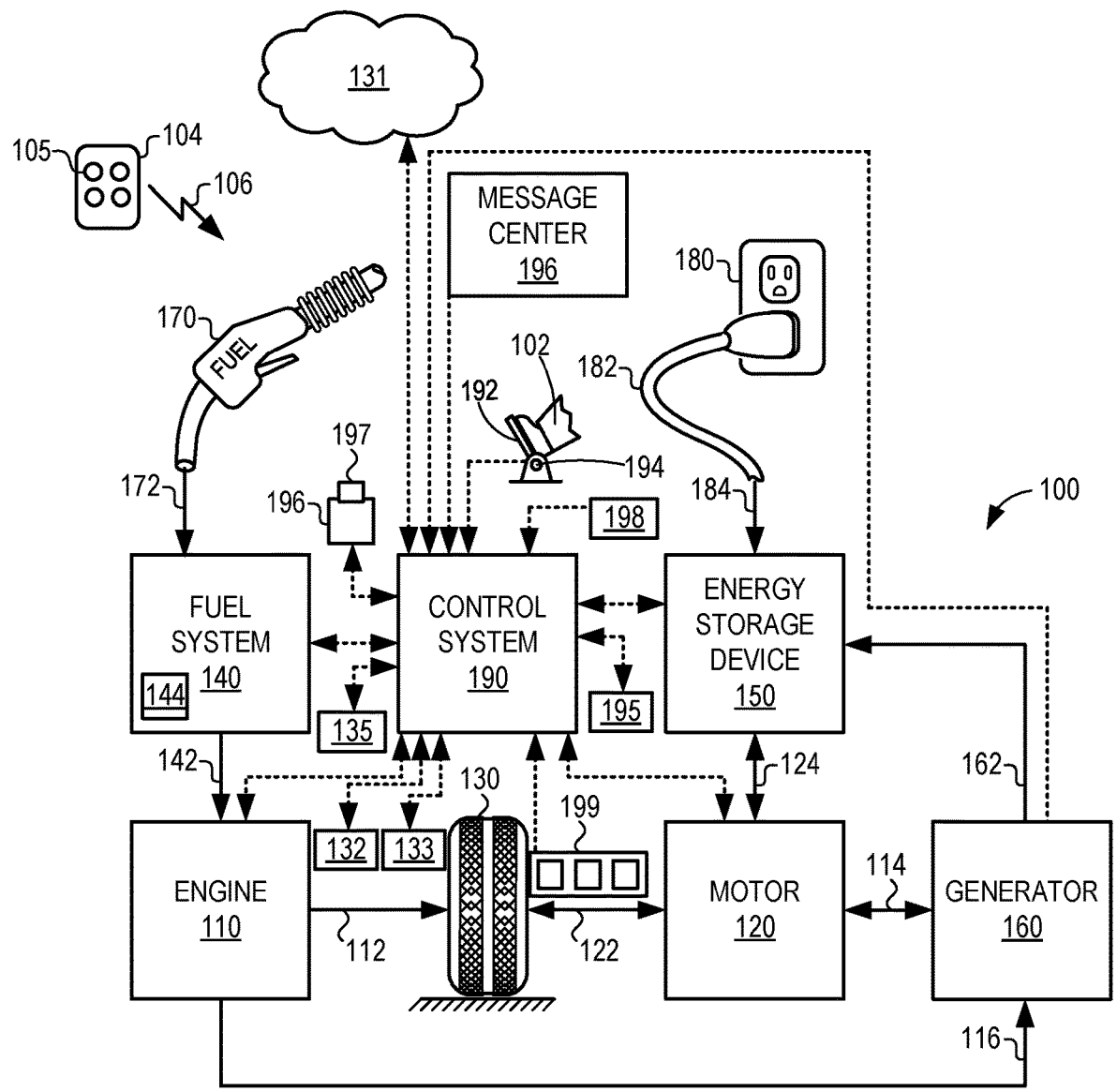
FIG. 1 shows a high-level block diagram illustrating an example vehicle system.
Figure 2:
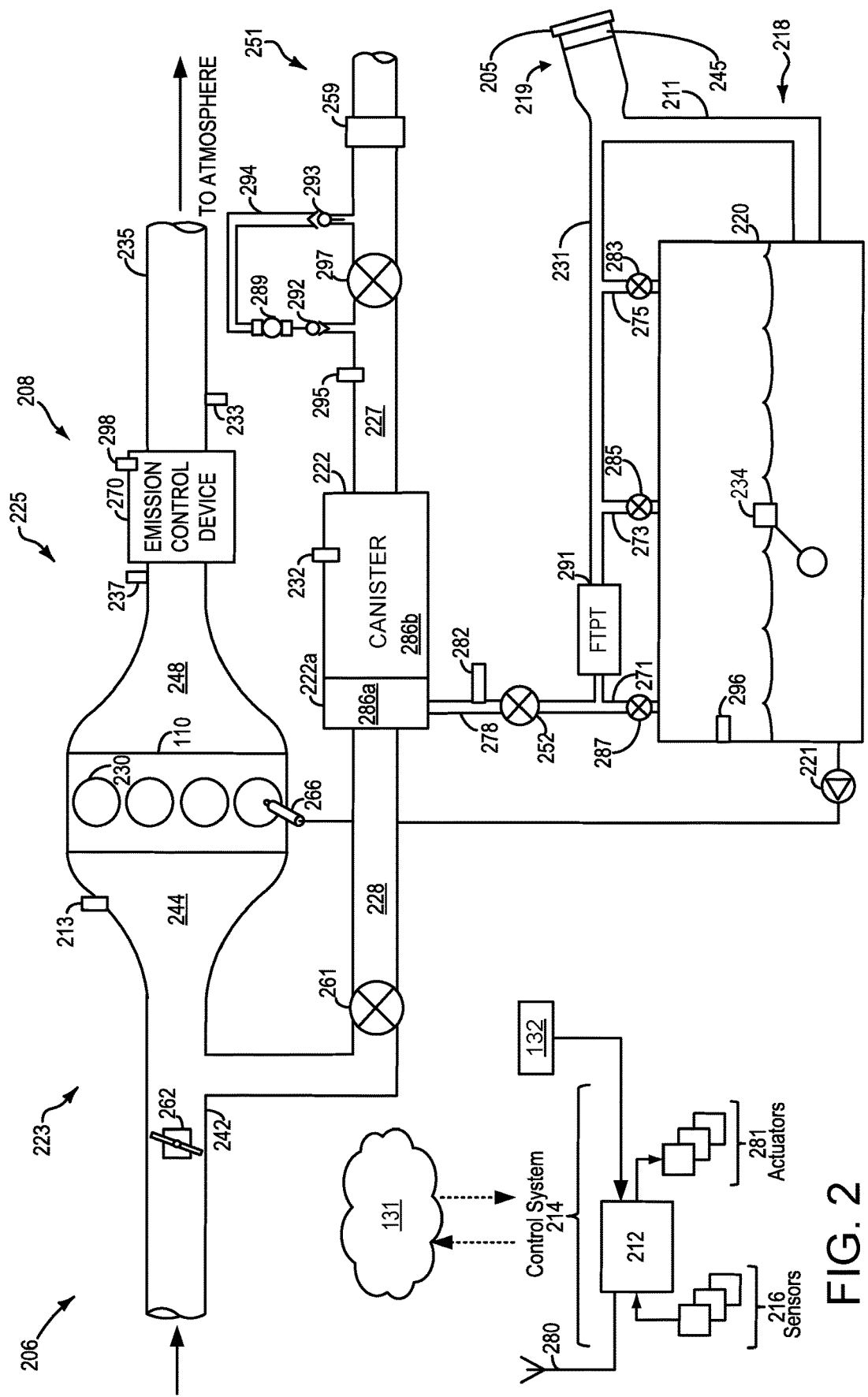
FIG. 2 schematically shows an example vehicle system with a fuel system and an evaporative emissions system.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle system 100 may include lasers, radar, sonar, acoustic sensors 133, which may enable vehicle location, traffic information, etc., to be collected via the vehicle.

FIG. 2 shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system (also referred to herein as an evaporative emissions system, or evap system) 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle equipped with an engine and not an motor that can operate to at least partially propel the vehicle, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. In some examples, an electric heater 298 may be coupled to the exhaust catalyst, and utilized to heat the exhaust catalyst to or beyond a predetermined temperature (e.g. light-off temperature). One or more emission control devices may include a three-way catalyst, lean NOx trap, diesel particulate filter, oxidation catalyst, etc. It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

Fuel system 218 may include a fuel tank 220 coupled to a fuel pump system 221. It may be understood that fuel tank 220 may comprise the same fuel tank as fuel tank 144 depicted above at FIG. 1. In an example, fuel tank 220 comprises a steel fuel tank. In some examples, the fuel system may include a fuel tank temperature sensor 296 for measuring or inferring a fuel temperature. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system (referred to herein as evaporative emissions system) 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222, as discussed. The fuel vapor canisters may be filled with an appropriate adsorbent 286b, such that the canisters are configured to temporarily trap fuel vapors (including vaporized hydrocarbons) during fuel tank refilling operations and during diagnostic routines, as will be discussed in detail below. In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

In some examples, vent line 227 may include a hydrocarbon sensor 295. Such a hydrocarbon sensor may be configured to monitor for a presence of hydrocarbons in the vent line, and if detected, mitigating actions may be undertaken to prevent undesired bleed-emissions from reaching atmosphere.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (where included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. In some examples, purging may include additionally commanding open the FTIV, such that fuel vapors from the fuel tank may additionally be drawn into the engine for combustion.

Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3 and FIGS. 5-6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors, or via expiration of a timer set such that when the timer expires the controller is returned to the awake mode. In some examples, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct evaporative emissions test diagnostic routines.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown after a drive cycle. However, for a hybrid vehicle application, there may be limited engine run time, which may result in situations where EONV tests may not be robust due to, for example, a lack of heat rejection from the engine to the fuel tank. Similarly, evaporative emissions detection routines may be performed while the engine is running by using engine intake manifold vacuum to evacuate the evaporative emissions system and/or fuel system, but such opportunities may be sparse in a hybrid vehicle application.

Thus, undesired evaporative emissions detection routines may in some examples include a vacuum pump configured to apply a positive or negative pressure with respect to atmospheric pressure on the fuel system and/or evaporative emissions system. For example, evaporative emissions test diagnostics may in some examples include an evaporative level check module (ELCM) (not shown), communicatively coupled to controller 212. Such an ELCM may be coupled to vent 227, between canister 222 and atmosphere. Such an ELCM may include a vacuum pump for applying negative pressure to the fuel system and/or evaporative emissions system when administering a test for the presence or absence of undesired evaporative emissions. Such an ELCM may additionally include a reference orifice, and a pressure sensor. Thus, a reference check may be performed whereby a vacuum may be drawn on the reference orifice. Following the reference check, the fuel system and/or evaporative emissions system may be evacuated by the ELCM vacuum pump, such that in the absence of undesired evaporative emissions, the vacuum may pull down to the reference check vacuum level.

However, the inventors herein have recognized that the use of an ELCM such as that described above may increase costs during manufacturing, which may be desirable to avoid. Thus, to conduct undesired evaporative emissions detection routines, a vacuum pump 289 may be configured in a vacuum pump conduit 294. The vacuum pump may comprise a rotary vane pump, a diaphragm pump, a liquid ring pump, a piston pump, a scroll pump, a screw pump, a wankel pump, etc., and may be understood to be in parallel with the CVV 297. The vacuum pump conduit 294 may be configured to route fluid flow (e.g. air and fuel vapors) from vent line 227, around canister vent valve 297. Vacuum pump conduit 294 may include a first check valve (CV1) 292, and second check valve (CV2) 293. When the vacuum pump 289 is activated, air may be drawn from vent line 227 between canister 222 and CVV 297, through vacuum pump conduit 294, back to vent line 227 at a position between canister vent valve 297 and atmosphere. In other words, the vacuum pump may be activated to evacuate the evaporative emissions system 251, and may further evacuate fuel system 218, provided that FTIV 252 is commanded open via the controller. CV1 292 may comprise a pressure/vacuum-actuated valve that may open responsive to activating the vacuum pump to evacuate the fuel system and/or evaporative emissions system, and which may close responsive to the vacuum pump 289 being deactivated, or turned off. Similarly, CV2 may comprise a pressure/vacuum-actuated valve. When the vacuum pump 289 is activated to evacuate the fuel system and/or evaporative emissions system, CV2 293 may open to allow fluid flow to be routed from vacuum pump conduit 294 to atmosphere, and which may close responsive to the vacuum pump 289 being turned off. It may be understood that CVV 297 may be commanded closed in order to evacuate the fuel system and/or evaporative emissions system via the vacuum pump 289.

As discussed above, an ELCM may include a reference orifice that enables a determination of a vacuum level that, if achieved when evacuating the fuel system and/or evaporative emissions system, is indicative of an absence of undesired evaporative emissions. However, in the vehicle system 206, where the ELCM is not included but where the vacuum pump 289 is included, there may not be a reference orifice. Thus, additional calibrations may be utilized in order to determine vacuum thresholds for indicating a presence or absence of undesired evaporative emissions. For example, there may be a 3D lookup table stored at the controller, which may enable determination of thresholds as a function of ambient temperature and fuel level. In this way, the reference orifice may not be included, which may reduce costs associated with including an ELCM. As discussed in further detail above, such thresholds may be adjusted during a test for undesired evaporative emissions, to avoid aborting such a test, which may thus increase completion rates for such a test.

Furthermore, as discussed, an ELCM may include a pressure sensor. In the example vehicle system 206, a pressure sensor 282 is included, positioned in conduit 278. Thus, it may be understood that FTIV 252 is bounded by a fuel tank pressure sensor 291 (fuel tank pressure transducer) and pressure sensor 282 positioned in conduit 278 between FTIV 252 and canister 222. In this way, under conditions where the FTIV is closed, pressure sensor 282 may monitor pressure in the evaporative emissions system, and pressure sensor 291 may monitor pressure in the fuel system.

Thus, by employing the vacuum pump 289 in vacuum pump conduit 294, including CV1 292 and CV2 293, along with pressure sensor 282, manufacturing costs associated with including a means for evacuating the fuel system and evaporative emissions system during engine-off conditions, may be reduced.

As discussed, CVV 297 may function to adjust a flow of air and vapors between canister 222 and the atmosphere, and may be controlled during or prior to diagnostic routines. For example, the CVV may be opened during fuel vapor storing operations (for example, during fuel tank refueling) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In the example vehicle system 206, the configuration of the vacuum pump 289 positioned in vacuum pump conduit 294 may allow for purging operations and refueling operations to be conducted without an undesirable additional restriction (the pump 289, and check valves CV1, CV2). In other words, during purging and refueling operations, the CVV may be commanded open, where flow of fluid through vacuum pump conduit 294 may be prevented via the check valves (CV1, CV2) and with the vacuum pump 289 deactivated.

In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed may be reduced.

Thus, one example of a test diagnostic for determining a presence or absence of undesired evaporative emissions using vacuum pump 289 may comprise closing the CVV and CPV, and activating the vacuum pump to evacuate the evaporative emissions system with the FTIV closed. If a threshold vacuum is reached (monitored via pressure sensor 282), an absence of gross undesired evaporative emissions may be indicated. Responsive to the indication of the absence of gross undesired evaporative emissions, the vacuum pump 289 may be stopped, or deactivated. With the vacuum pump 289 deactivated, CV1 292 (and CV2 293) may close, thus sealing the evaporative emissions system from atmosphere. Responsive to sealing the evaporative emissions system from atmosphere, pressure bleed-up may be monitored, and if pressure bleed-up is below a pressure bleed-up threshold, or if a pressure bleed-up rate is less than a pressure bleed-up rate threshold, an absence of non-gross undesired evaporative emissions in the evaporative emissions system may be indicated.

In similar fashion, the vacuum pump 289 may be utilized to evacuate the fuel system, with the FTIV open (e.g. actuated open via a command from the controller). If a threshold vacuum is reached (monitored via either pressure sensor 282 or fuel tank pressure transducer 291), then an absence of gross undesired evaporative emissions may be indicated. Responsive to the indication of the absence of gross undesired evaporative emissions stemming from the fuel system, the fuel system may be sealed via commanding closed the FTIV (e.g. actuating closed the FTIV via a command from the controller), and pressure bleed-up in the fuel system may be monitored. Responsive to an indication that pressure bleed-up is less than a pressure bleed-up threshold, or if a pressure bleed-up rate is less than a pressure bleed-up rate threshold, an absence of non-gross undesired evaporative emissions in the fuel system may be indicated (provided that the evaporative emissions system is known to be free from undesired evaporative emissions).

In still other examples, the fuel system and evaporative emissions system may be evacuated together with the FTIV open, and upon the threshold vacuum being reached, the fuel system and evaporative emissions system may be sealed from atmosphere, and further the fuel system and evaporative emissions system may be sealed from each other via the controller commanding closed the FTIV. In this way, pressure in the fuel system may be independently monitored from pressure in the evaporative emissions system, such that the fuel system may be diagnosed as to the presence or absence of undesired evaporative emissions independently of the evaporative emissions system.

However, as discussed above, there may be circumstances where pressure bleed-up may be adversely impacted via one or more of ambient temperature, fuel temperature, fuel volatility, fuel slosh, presence of rain or puddle conditions that may cool the fuel system and/or evaporative emissions system, altitude changes, etc. Such circumstances may result in pressure bleed-up that is artificially increased (e.g. where fuel volatility is high, where a fuel slosh event occurs, and/or where an abrupt increase in elevation occurs), or may result in pressure bleed-up that is artificially decreased (e.g. a circumstances where the fuel system and/or evaporative emissions system is rapidly cooled via driving through a puddle, or where an abrupt decline in elevation occurs). Such occurrences may in some examples result in false failures, such as an indication of the presence of undesired evaporative emissions when, in fact, the fuel system and/or evaporative emissions system are free from the presence of undesired evaporative emissions. Such occurrences may in other examples result in false passes, such as an indication of an absence of undesired evaporative emissions when, in fact, there is a source of undesired evaporative emissions stemming from the fuel system and/or evaporative emissions system. The inventors have herein recognized these issues, and have developed methodology to avoid such issues, as will be discussed in detail below with regard to FIG. 3 and FIGS. 5-6. Briefly, such methodology may include dynamically varying thresholds for indicating whether a fuel system and/or evaporative emissions system includes a source of undesired evaporative emissions or not. Such methodology may further include evacuating the fuel system and/or evaporative emissions system to variable levels of target vacuum (e.g. negative pressure with respect to atmospheric pressure), as a function of whether conditions are learned, predicted, inferred, or measured to be such that the pressure bleed-up portion of an evaporative emissions test diagnostic may be adversely impacted by such conditions. For example, consider a situation where it is learned (discussed in detail below) that the vehicle fuel tank includes a high reid vapor pressure (RVP) fuel. If ambient temperature is also high, it may be inferred that such conditions may result in a pressure bleed-up during the pressure bleed-up portion of an evaporative emissions test that may complicate interpretation of the results of such a test. In such a case, the fuel system and/or evaporative emissions system may be evacuated to a greater or deeper (e.g. more negative with respect to atmospheric pressure) vacuum to increase signal-to-noise for the test, and may further include dynamically adjusting a pressure bleed-up threshold for whether the system passes or fails such a test. In another example, consider a situation where it is learned or predicted that a vehicle may travel on a road that may result in one or more fuel slosh events, which may complicate interpretation of a test of undesired evaporative emissions, if not accounted for. In such an example, the fuel system and/or evaporative emissions system may be evacuated to a deeper vacuum, and in response to a fuel slosh event, the threshold for whether the fuel system and/or evaporative emissions system passes or fails, may be dynamically adjusted accordingly. Other examples and further description is provided below.

In some examples where the fuel system is evacuated (thus drawing fuel vapors to the canister, further loading the canister), the variable levels of target vacuum may be a function of ambient temperature, and a loading state of the fuel vapor storage canister. For example, consider a situation where one or more fuel slosh events are learned/predicted to adversely impact the pressure bleed-up portion of an evaporative emissions test diagnostic. Accordingly, it may thus be desirable to conduct the evaporative emissions test diagnostic by drawing a deeper vacuum (as compared to a basal vacuum, which as discussed herein may comprise −8 InH2O) on the fuel system and/or evaporative emissions system, such that in the event that the one or more fuel slosh event(s) occur during the pressure bleed-up portion of the test, there may be more signal-to-noise to enable thresholds for passing/failing the test to be dynamically adjusted. However, evacuating the fuel system to deeper vacuum may be balanced by a desire to avoid bleed-through emissions which may result from a loaded canister at particular ambient temperatures. Thus, when conducting evaporative emissions test diagnostics that include evacuating the fuel system which may load the canister with additional fuel vapors, a lookup table may be queried which may indicate a maximum amount of vacuum that may be drawn on the fuel system as a function of ambient temperature (and in some examples additionally or alternatively fuel temperature) and canister loading state, such that bleed-through emissions may be reduced or avoided. Such a lookup table will be further described below at FIG. 4.

Accordingly, in order to predict circumstances where conditions may be such that a pressure bleed-up portion of an evaporative emissions test diagnostic may be adversely impacted, the vehicle controller may include methodology to learn routes commonly traveled by the vehicle. Thus, turning to FIG. 3, a high-level example method 300 for learning common driving routes driven in a vehicle, is shown. More specifically, method 300 may be utilized to learn common driving routes traveled by the vehicle, and may further be utilized to learn particular segments of the common driving routes where fuel slosh is likely or expected to occur. In one example, learning fuel slosh events may include learning particular segments of a commonly driven route where one or more fuel slosh events are of a magnitude greater than a threshold fuel slosh magnitude. In another example, learning common driving routes may include learning particular segments of a driving route where an altitude change of at least a predetermined altitude change threshold occurs. The altitude change may either comprise an increase in elevation, or a decrease in elevation. Such examples may enable evacuation of the evaporative emissions system and/or fuel system to a variable vacuum, and may further enable dynamically varying thresholds for whether the system passes or fails the evaporative emissions test diagnostic.

Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, canister vent valve (CVV) (e.g. 297), canister purge valve (CPV) (e.g. 261), etc., according to the methods depicted below.

Method 300 begins at 305 and may include indicating whether a key-on event is indicated. A key-on event may comprise an ignition key being utilized to start a vehicle either in an engine-on mode, or an electric only mode of operation. In other examples, a key-on event may comprise an ignition button on the dash, for example, being depressed. Other examples may include a key-fob (or other remote device including smartphone, tablet, etc.) starting the vehicle in either an engine-on mode, or an electric-only mode of operation. If, at 305, a key-on event is not indicated, method 300 may proceed to 310, and may include maintaining current vehicle operating parameters. For example, at 310, method 300 may include maintaining a CPV, CVV, FTIV, engine, etc., in their current conformations and or current modes of operation. Method 300 may then end.

Returning to 305, responsive to a key-on event being indicated, method 300 may proceed to 315, and may include accessing vehicle location, driver information, day of the week (DOW), time of day (TOD), etc. A driver's identity may be input by the driver, or inferred based on driving habits, seat position, cabin climate control preferences, voice activated commands, etc. Vehicle location may be accessed via an onboard navigation system, for example via GPS, or other means such as via wireless communication with the internet.

Proceeding to 320, method 300 may include recording vehicle route information during the drive cycle commencing from the key-on event. In some examples, vehicle route information may be divided into one or more segments, with the one or more segments being bordered by a key-on event indicating a start location, and a key-off event indicating a final destination. However, it may be understood that there may be one or more stops between a key-on event signaling the start of a route, and a key-off event indicating arrival at a final destination. Such stop events may be opportunities to conduct evaporative emissions test diagnostics, in some examples.

At 320, the vehicle controller may continuously collect data from various sensor systems and outside sources regarding the vehicle's operations/conditions, location, traffic information, local weather information, etc. The data may be collected by, for example, GPS (e.g. 132), inertial sensors (e.g. 199), lasers, radar, sonar, acoustic sensors, etc. (e.g. 133). Other feedback signals, such as input from sensors typical of vehicles may also be read from the vehicle. Example sensors may include tire pressure sensors, engine temperature sensors, brake heat sensors, brake pad status sensors, tire tread sensors, fuel sensors, oil level and quality sensors, air quality sensors for detecting temperature, humidity, fuel level sensors (e.g. 234), barometric pressure sensors (e.g. 213), etc. Still further, at 320, the vehicle controller may also retrieve various types of non-real time data, for example information from a detailed map, which may be stored in at the controller or which may be retrieved wirelessly.

In some examples, recording vehicle route information may additionally include recording data, for example, from the fuel level indicator (e.g. 234), for a predetermined amount of time after they key-off event. To conduct such recording of data, the controller may be kept awake for the predetermined amount of time, and may then be put to sleep. Such action may be undertaken in order to obtain information related to whether or not a vehicle operator loads/ unloads the vehicle with supplies, etc., after the key-off event. More specifically, loading/unloading contents to/from the vehicle may result in disturbances to the vehicle, which if encountered during a pressure bleed-up portion of an evaporative emissions test diagnostic, may adversely impact interpretation of the test. Such action of loading/unloading the vehicle at key-off may be a common or regular occurrence for particular drive cycles, in some examples, and such a key-off event may comprise a time where an evaporative emissions test diagnostic is likely to commence. Consider for example a vehicle that a vehicle operator takes to and from a place of employment. Depending on the work conducted by the vehicle operator, at a key-off event corresponding to the vehicle operator's home, the vehicle operator may regularly unload particular contents from the vehicle, and/or load other contents to the vehicle. Thus, it may be desirable to learn such events, such that in the event that an evaporative emissions test diagnostic is conducted on the fuel system at the key-off event where contents are loaded/unloaded from the vehicle, the fuel system may be evacuated to a variable vacuum level, which may enable compensating for any pressure disturbances during the pressure bleed-up portion by dynamically adjusting thresholds for passing/failing the test.

Accordingly, data regarding a particular vehicle driving route, or trip vector, may be obtained and stored at the vehicle controller during the course of the vehicle being driven along the particular route. Proceeding to 325, method 300 may include processing the data to establish predicted/ learned driving routes. For example, numerous trip vectors and corresponding information may be obtained and stored at the vehicle controller, such that predicted/learned driving routes may be achieved with high accuracy. In some examples, a vehicle may travel route(s) that are not frequently traveled (e.g. not "common"). Thus, it may be understood that route information that is not correlated significantly with commonly driven routes may be periodically forgotten, or removed, from the vehicle controller, in order to prevent the accumulation of exorbitant amounts of data pertaining to vehicle travel routines.

In some examples data collected from the vehicle travel routines including GPS data may be applied to an algorithm that feeds into one or more machine learning algorithms to determine common vehicle travel routes. Such an example is meant to be illustrative, and is not meant to be limiting. For example, any commonly used methodology for vehicle route learning may be utilized via the vehicle controller in order to establish learned travel routes without departing from the scope of this disclosure.

As discussed, learning driving routes at 325 may include determining particular segments of commonly traveled routes where one or more fuel slosh events are predicted/ learned to be greater than the threshold fuel slosh magnitude and particular segments where an altitude change of at least a predetermined altitude change threshold occurs. As discussed above and which will be further discussed below, such information may enable the fuel system and/or evaporative emissions system to be evacuated to varying levels for conducting an evaporative emissions test diagnostic, and may further enable an option for dynamically varying thresholds for indicating whether a fuel system and/or evaporative emissions system passes or fails such an evaporative emissions test.

Proceeding to 330, method 300 may include storing information pertaining to learned driving routes into one or more lookup table(s) at the vehicle controller. The lookup tables may be accessed at key-on events, and may additionally or alternatively be accessed during vehicle operation. For example, upon a request to conduct an evaporative emissions test diagnostic, the lookup tables may be accessed in order to determine an appropriate vacuum to evacuate the fuel tank and/or evaporative emissions system to, based on whether fuel slosh events are predicted, whether altitude changes are predicted, etc. Furthermore, thresholds for passing/failing tests may be set as a function of the level of vacuum to apply on the fuel system and/or evaporative emissions system, where such thresholds may be dynamically adjusted in response to the one or more fuel slosh events, altitude changes, etc.

As discussed above, in some examples it may be desirable to balance an amount or magnitude of vacuum that the fuel system is evacuated to, with an amount of fuel vapors that load the canister, as a result of the evacuation. In other words, to avoid bleed-through emissions which may result, particularly in a hybrid vehicle, if a canister is loaded to a particular loading state(s) and is not purged shortly thereafter, an amount or magnitude that the fuel system is evacuated to may be a function of canister loading state and ambient temperature (and fuel temperature in some examples). It may be understood that such compensation for additional fuel vapors added to the canister may only be conducted under conditions where the fuel system is evacuated (e.g. FTIV open), as evacuating only the evaporative emissions system (e.g. FTIV closed) may not further load the canister.

Accordingly, shown at FIG. 4 is an example lookup table 400 that depicts a maximum amount of vacuum that the fuel system may be evacuated to, as a function of ambient temperature and canister loading state, for conducting an evaporative emissions test diagnostic. For example, at low temperatures such as below 40° F., the maximum vacuum that may be drawn on the fuel system may be −28InH2O for canister loading states comprising 30% or less, but as canister loading states increase, the maximum vacuum that may be applied to the fuel system may be reduced (e.g. −16InH2O at a canister loading state greater than 90% loaded), such that bleed-through emissions may be reduced or avoided. Similar logic applies to higher ambient temperatures and varying loading states of the canister. For example, at temperatures greater than 90° F., it may not be desirable to evacuate the fuel system at all if the loading state of the canister is 76% loaded or more. In other words, any further loading of the canister under conditions where ambient temperature is greater than 90° F. and canister loading state is 76% or greater, may increase the potential for bleed emissions to an undesirable level. Additionally, even for loading states less than 15% loaded, the maximum vacuum that may be drawn on the fuel system may be only −20InH2O when ambient temperature is greater than 90° F., as compared to −28InH2O for similar loading state but temperatures less than 40° F.

Thus, when evacuating the fuel system in order to conduct a diagnostic for the presence or absence of undesired evaporative emissions stemming from the fuel system, under conditions where a deeper vacuum as compared to basal vacuum (e.g. −8InH2O) is desired due to an indication of conditions that may adversely impact the pressure bleed-up portion of such a test, a lookup table such as that of FIG. 4 may be queried in order to avoid evacuating the fuel system to a point where a potential for bleed-through emissions is increased or likely.

As discussed, such compensation may only be utilized when evacuating the fuel system, and not under conditions where the evaporative emissions system is evacuated but not the fuel system (e.g. FTIV closed). In a case where the evaporative emissions system (but not the fuel system) is evacuated for conducting an evaporative emissions test diagnostic, the level of vacuum applied on the evaporative emissions system may be variable but may not be a function of canister loading state, as fuel vapors from the fuel tank may not be routed from the tank to the canister under conditions where the fuel system but not the evaporative emissions system is evacuated. For example, consider a situation where a learned altitude increase greater than the predetermined altitude change threshold is inferred to occur during a pressure bleed-up portion of an evaporative emissions test diagnostic. In such an example, it may be desirable to pull the evaporative emissions system down to a deeper vacuum (e.g. more negative than the basal vacuum), in order to enable the threshold for passing/failing the test diagnostic to be dynamically adjusted in response to the change in altitude impacting the pressure bleed-up portion of the test.

As discussed above, another factor that may adversely impact a pressure bleed-up portion of an evaporative emissions test is a presence of high RVP fuel in a fuel tank of a vehicle being diagnosed, provided that the evaporative emissions test includes diagnosis of the fuel system. In other words, high RVP fuel may not adversely impact the pressure bleed-up portion of an evaporative emissions test that includes evacuating the evaporative emissions system but not the fuel system (as fuel vapors and any resultant pressure generation are maintained in the fuel tank), but may adversely impact the pressure bleed-up portion under conditions where the fuel system is evacuated. While other methods may include aborting or preventing commencing an evaporative emissions test diagnostic if high RVP fuel is identified, such action may not be desirable as it may result in lower completion rates, reduced fuel economy (e.g. if the test is commenced but then aborted), etc. Thus, it may be desirable to detect high RVP fuel in a vehicle fuel tank prior to commencing an evaporative emissions test diagnostic (e.g. within a threshold duration of the diagnostic), such that the vacuum that the fuel system may be evacuated to may be increased (e.g. more negative with respect to atmospheric pressure) under conditions where high RVP fuel is detected, which may thus enable dynamic adjustment of passing/failing thresholds for such a test.

Accordingly, turning to FIG. 5, a high-level example method 500 for determining fuel volatility in a fuel tank of a vehicle is shown. In other words, method 500 comprises a fuel RVP learning step. More specifically, method 500 may be used at specified events while the vehicle is stationary, where the method may include venting (if sealed) the fuel system until the fuel system is at atmospheric pressure, and then sealing the fuel system. Pressure in the fuel system may then be monitored for a predetermined time. Monitoring pressure in the fuel system over the course of the predetermined time may comprise a "surrogate RVP gage", where a pressure build magnitude may correspond to the RVP of the fuel in the fuel system. In one example, the predetermined time that pressure in the sealed fuel system is monitored may comprise the same duration of time that the pressure bleed-up portion of the evaporative emissions test diagnostic comprises. High RVP fuel may be determined in the fuel RVP learning step responsive to the pressure build magnitude being greater than a predetermined pressure build magnitude threshold, as one example. The predetermined pressure build magnitude threshold may comprise a 1InH2O pressure build with the fuel system sealed for one minute, or a 2InH2O pressure build with the fuel system sealed for one minute, etc. In the event that high RVP fuel is identified in the fuel system, upon a request to conduct an evaporative emissions test diagnostic on the fuel system, the fuel system may be evacuated to a variable vacuum level that is a function of ambient temperature and canister loading state, as discussed above. Furthermore, thresholds for passing/failing the test may be adjusted. More specifically, as discussed above, thresholds for passing/failing results may be a function of at least ambient temperature and fuel level, and may be stored at the controller as a lookup table. Such threshold(s) may be adjusted by the amount of pressure observed in the fuel RVP learning step discussed above.

Method 500 will be described in reference to the systems described in FIGS. 1-2, though it should be understood that method 500 may be applied to other systems without departing from the scope of this disclosure. Method 500 may be carried out by a controller, such as controller 212, and may be stored as executable instructions in non-transitory memory. Instructions for carrying out method 500 and the rest of the methods included herein may be executed by the controller based on instructions stored on a memory of the controller and in conjunction with signals received from sensors of the vehicle system, such as the sensors described above with reference to FIGS. 1-2. The controller may employ fuel system and evaporative emissions system actuators such as FTIV (e.g., 252), vacuum pump (e.g. 289), CVV (e.g. 297), etc., according to the methods depicted below.

Method 500 begins at 505 by evaluating current vehicle operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, etc.

Proceeding to 510, method 500 may include indicating whether conditions are met for conducting the fuel RVP learning. Conditions being met at 510 may include an indication that the vehicle is stationary. Conditions being met at 510 may additionally or alternatively include an indication that the fuel tank of the vehicle has been refueled. For example, responsive to an indication that a vehicle refueling event has occurred, the learning step may be conducted just prior to the vehicle being driven. In other examples, conditions may be met responsive to an indication that a refueling event was followed by a drive cycle and then a key-off event. For instance, at the key-off event, the controller may be kept alive in order to conduct the RVP learning step. In still other examples, conditions may be met responsive to a key-on event, where the vehicle is stationary. In one example, the key-on event may comprise a remote start event. Conditions being met at 510 may in some examples comprise a key-on or key-off event, and where a predetermined time duration has elapsed since a prior fuel RVP learning step without an indication of a refueling event since the prior RVP learning step. For example, RVP of fuel may change over time, and for a hybrid vehicle with limited engine run-time, a same fuel may be stored in the fuel tank for a duration of time where the fuel RVP may change. Thus, the fuel RVP learning step may be periodically conducted, provided conditions are met at 510 for doing so. In still other examples, conditions being met at 510 may include an engine idle condition, such as that which may occur at a start/stop event. Still further, conditions being met at 510 may include an indication of an absence of undesired evaporative emissions in the fuel system.

If, at 510, conditions are not indicated to be met for conducting the fuel RVP learning step, method 500 may proceed to 515. At 515, method 500 may include maintaining current vehicle operating conditions. For example, if the engine is not in operation, such conditions may be maintained. If the engine is in operation, then the current operating conditions involving one or more of the engine, motor, etc., may be maintained. Method 500 may then end.

Returning to 510, responsive to conditions being met at 510 for conducting the fuel RVP learning step, method 500 may proceed to 520. At 520, method 500 may include venting the fuel system, under conditions where the fuel system is sealed. In one example where the vehicle has been refueled, the fuel tank may not be sealed (e.g. FTIV open). Thus, in such an example, the venting may include venting any pressure build in the fuel system resulting from the refueling event. In other examples, the FTIV may be closed, which may trap pressure in the fuel system. Accordingly, prior to conducting the fuel RVP learning step, the fuel system may be vented. In such an example, venting the fuel system may include commanding open the FTIV, and commanding open or maintaining open the CVV. The CPV may be maintained or commanded to a closed configuration. In this way, the fuel system may be vented to atmosphere.

Proceeding to 525, method 500 may include indicating whether the fuel system pressure has reached atmospheric pressure. If not, the fuel system may continue to be vented. Alternatively, responsive to an indication that the fuel system has reached atmospheric pressure, method 500 may proceed to 530, and may include sealing the fuel system. Sealing the fuel system may include commanding closed the FTIV, in one example. In another example, sealing the fuel system may include maintaining open the FTIV, and commanding closed the CVV.

With the fuel system sealed, method 500 may proceed to 535. At 535, method 500 may include monitoring and recording fuel system pressure bleed-up for a predetermined duration. As discussed above, in some examples the predetermined duration may comprise the same duration as that of the pressure bleed-up portion of an evaporative emissions test diagnostic, but in other examples the predetermined duration may be different.

The pressure bleed-up recorded at 535 may thus comprise an indication of the RVP of the fuel stored in the fuel tank. Thus, proceeding to 540, method 500 may include storing the results of the fuel RVP learning step at the controller. More specifically, at 540, method 500 may include storing the conditions under which the test was conducted, and the results of the test. For example, ambient temperature and the pressure bleed-up may be stored at the controller. The controller may include a model of ambient temperature and pressure bleed-up as a function of fuel RVP, which may enable a determination of an expected or predicted pressure bleed-up for the particular fuel stored in the fuel tank, as a function of ambient temperature. In this way, for an evaporative emissions test that may be conducted at a different ambient temperature than the fuel RVP learning test was conducted at, an expected pressure bleed-up due to the RVP of the fuel itself may be determined for that particular temperature. By determining an expected pressure bleed-up due to the RVP of the fuel itself, as a function of ambient temperature, thresholds for passing/failing an evaporative emissions test may be adjusted as a function of the expected pressure bleed-up due to the RVP of the fuel. More specifically, and which has been discussed above and which will be discussed in further detail below, thresholds for passing/failing an evaporative emissions test diagnostic may be a function of at least ambient temperature and fuel level. Such thresholds may be adjusted based on the expected pressure bleed-up due to the RVP of the fuel, the RVP of the fuel learned at the fuel learning step described herein. In other words, a lookup table for obtaining thresholds for passing/failing results of an evaporative emissions test diagnostic may be repopulated or updated to include the expected or predicted pressure bleed-up resulting from the RVP of the fuel itself. Method 500 may then end.

Turning now to FIG. 6, a high level example method 600 for conducting an evaporative emissions test diagnostic, is shown. More specifically, method 600 may include conducting an evaporative emissions test diagnostic on the fuel system and evaporative emissions system of a vehicle, where an amount of vacuum drawn on the fuel system and evaporative emissions system may be a function of conditions that may adversely impact or complicate interpretation of a pressure bleed-up portion of the evaporative emissions test, if not accounted for. Furthermore, thresholds for passing/failing the test may be dynamically adjusted as a function of the conditions that may adversely impact interpretation of the pressure bleed-up portion of the test.

Method 600 will be described in reference to the systems described in FIGS. 1-2, though it should be understood that method 600 may be applied to other systems without departing from the scope of this disclosure. Method 600 may be carried out by a controller, such as controller 212, and may be stored as executable instructions in non-transitory memory. Instructions for carrying out method 600 and the rest of the methods included herein may be executed by the controller based on instructions stored on a memory of the controller and in conjunction with signals received from sensors of the vehicle system, such as the sensors described above with reference to FIGS. 1-2. The controller may employ fuel system and evaporative emissions system actuators such as FTIV (e.g. 252), vacuum pump (e.g. 289), CVV (e.g. 297), etc., according to the methods depicted below.

Method 600 begins at 605, and may include evaluating current vehicle operating conditions. Operating conditions may be estimated, measured, and/or inferred, and may include ambient conditions, such as temperature, humidity, barometric pressure, etc., engine conditions, such as engine operating status, engine speed, engine load, etc., as well as fuel system conditions, such as fuel level, fuel tank pressure, etc.

Proceeding to 610, method 600 may include indicating whether conditions are indicated to be met for conducting an evaporative emissions test diagnostic. Conditions being met at 610 may in one example include an indication that a predetermined duration has elapsed since a prior evaporative emissions test diagnostic has been conducted. Conditions being met at 610 may in some examples include an indication that the vehicle is in operation, being propelled via one or more of the engine and/or electric motor. In other examples, conditions being met at 610 may include an indication of a key-on event, or an indication of a key-off event. Conditions being met at 610 may in some examples include no prior indication of undesired evaporative emissions in the fuel system and/or evaporative emissions system. In some examples, conditions being met at 610 may include an indication that the fuel system is near atmospheric pressure, under conditions where the fuel system is sealed. For example, the fuel system being at or near atmospheric pressure may in some examples be indicative of a fuel system with a source of undesired evaporative emissions, as a fuel system without a source of undesired evaporative emissions may be expected to hold a pressure or vacuum a majority of the time. However, there may also be conditions during a diurnal cycle where pressure in a sealed fuel system is at or near atmospheric pressure, due to ambient temperature, fuel temperature, whether the vehicle is in operation or not, etc. Thus, if the fuel system is near atmospheric pressure, it may be desirable to conduct a test for a presence or absence of undesired evaporative emissions stemming from the fuel system.

If, at 610, conditions are not indicated to be met for conducting the evaporative emissions test diagnostic, method 600 may proceed to 615. At 615, method 600 may include maintaining current vehicle operating conditions. For example, if the vehicle is not in operation, such conditions of the engine, electric motor, etc., may be maintained. Alternatively, if the vehicle is in operation, the operational status of the engine, electric motor, etc., may be maintained. Method 600 may then end.

Returning to 610, responsive to conditions being indicated to be met for conducting the evaporative emissions test diagnostic, method 600 may proceed to 620. At 620, method 600 may include determining a target vacuum to drawn on the fuel system and evaporative emissions system. More specifically, determining the target vacuum at 620 may include querying the controller as to whether there are conditions indicated that may adversely impact the pressure bleed-up portion of the evaporative emissions test diagnostic, if the evaporative emissions test diagnostic were to be conducted given the current vehicle operating conditions.

For example, the controller may be queried as to whether the vehicle is traveling along a route that comprises a learned route stored at the controller. If so, it may be further indicated as to whether learned route includes learned conditions that may impact interpretation of the pressure bleed-up portion of the test diagnostic. More specifically, it may be indicated as to whether the vehicle is traveling along a route where one or more fuel slosh events are learned/predicted to occur. The one or more fuel slosh events may comprise fuel slosh events while the vehicle is being propelled, or may include fuel slosh events while the vehicle is stationary (e.g. loading/unloading the vehicle). If it is inferred that, by conducting the evaporative emissions test, that the one or more fuel slosh events may occur during the pressure bleed-up portion of the test, then the target vacuum may be determined as a function of the predicted fuel slosh events. For example, as a number of predicted fuel slosh events increase, the target vacuum may increase, or become more negative with respect to atmospheric pressure.

In another example, the controller may be queried as to whether the vehicle is traveling along a route where an altitude change of at least a predetermined altitude change threshold is learned/predicted to occur. If the altitude change may potentially occur during the pressure bleed-up portion of the evaporative emissions test diagnostic, then the target vacuum may be adjusted as a function of the learned altitude change. For example, as the altitude change increases, the target vacuum may increase (e.g. be made more negative with respect to atmospheric pressure), provided that the altitude change involves an increase in altitude. Alternatively, if the altitude change comprises a decrease in altitude, then the target vacuum may not be dependent on the altitude change (as decreasing altitude may counter pressure build in the fuel system), but pressure bleed-up thresholds for passing/failing the test may be adjusted, as will be discussed in further detail below.

In another example, the target vacuum may be determined as a function of whether or not the fuel tank is storing high RVP fuel. More specifically, if, based on method 500, it is indicated that the fuel system of the vehicle includes high RVP fuel, then the target vacuum may be adjusted as a function of the high RVP fuel. For example, as the RVP increases the target vacuum level may increase (e.g. become more negative with respect to atmospheric pressure).

In still other examples, the target vacuum may be a function of external conditions such as rain, puddle conditions, etc. Such information may be obtained via an onboard navigation system (e.g. GPS), via the controller interfacing with the internet to retrieve current and forecast weather information, etc. It may be understood that rain/puddle conditions may counter a pressure build in the fuel system/evaporative emissions system, thus the target vacuum may not be increased (made more negative with respect to atmospheric pressure) in response to the rain/puddle condition, but the rain/puddle condition may still be taken into account as a function of other parameters such as fuel level, ambient temperature, fuel RVP, etc., in determining the target vacuum to apply on the fuel system and evaporative emissions system to conduct the evaporative emissions test diagnostic.

Any determination of target vacuum may further account for ambient temperature, fuel level, and canister loading state, as discussed above. For example, higher ambient temperatures and fuel level may make it desirable to evacuate the fuel system and evaporative emissions system to deeper vacuum levels in order to increase signal-to-noise, but such evacuation may further load the canister, discussed above with regard to FIG. 4. Thus, determining the target vacuum may also include taking into account ambient temperature, fuel level, canister loading state, in addition to the circumstances that may impact the pressure bleed-up portion of the evaporative emissions test.

Still further, in some examples, determining the target vacuum at 620 may include taking into account more than one of the conditions that may adversely impact the pressure bleed-up portion of the test diagnostic. Consider for example a situation where high RVP fuel is identified, but where a rain/puddle condition is also indicated. In such an example, the target vacuum may be reduced (made less negative in relation to atmospheric pressure) as compared to a situation where high RVP fuel is identified but where the rain/puddle condition is not indicated. Another similar example includes a situation where high RVP fuel is detected, but where an altitude decrease is predicted to occur during the pressure bleed-up portion of the test. The decrease in altitude may counter an increase in pressure bleed-up due to the high RVP fuel, thus the target vacuum may be adjusted accordingly. Alternatively, in an example where high RVP fuel is indicated, and an altitude increase is indicated as well, the target vacuum may be increased (e.g. made more negative with respect to atmospheric pressure), as compared to a situation where only high RVP fuel was detected, or where the fuel is not of a high RVP but where an altitude increase is predicted.

Such examples are meant to be illustrative, and it may be understood that determining the target vacuum at 620 may include taking into account all of the variables discussed herein, including but not limited to ambient temperature, fuel temperature, fuel level, fuel RVP, learned/predicted fuel slosh events or other disturbances which may impact the pressure bleed-up portion of the test diagnostic, external weather conditions (e.g. rain, puddles, snow, sleet, hail), altitude changes that may impact interpretation of the pressure bleed-up portion of the test, etc. Taking into account the variables mentioned may include updating lookup tables stored at the controller for determining target vacuum, as a function of the identified variables.

With the target vacuum to draw on the fuel system and evaporative emissions system being determined at 620, method 600 may proceed to 625. At 625, method 600 may include reducing pressure in the fuel system and evaporative emissions system to the target vacuum level determined at 620. Thus, at 625, method 600 may include activating the vacuum pump (e.g. 289) in a vacuum-mode of operation such that a negative pressure is applied on the fuel system and evaporative emissions system. While not explicitly illustrated, it may be understood that applying the vacuum on the fuel system and evaporative emissions system may further include commanding open the FTIV, and commanding closed the CVV. In this way, the fuel system may be fluidically coupled to the evaporative emissions system, and the pump may draw the negative pressure on the fuel system and evaporative emissions system.

With the vacuum pump activated at 625, method 600 may proceed to 630. At 630, method 600 may include indicating whether the target vacuum level is achieved. For example, a fuel tank pressure sensor (e.g. 291) may be used to monitor fuel system and evaporative emissions system pressure. If, at 630, the target vacuum level is not indicated to have been reached, method 600 may proceed to 635. At 635, method 600 may include indicating whether a predetermined duration of time has elapsed. The predetermined duration of time may comprise a duration of time where, if the fuel system and evaporative emissions system were free from one or more sources of undesired evaporative emissions, then it may be expected that the target vacuum may be reached prior to the predetermined duration elapsing. Accordingly, if the predetermined duration is not indicated to have elapsed at 635, method 600 may include continuing to reduce pressure in the fuel system and evaporative emissions system.

Alternatively, if at 635, the predetermined duration is indicated to have elapsed, method 600 may proceed to 640. At 640, method 600 may include indicating fuel system and/or evaporative emissions system degradation. In some examples, a test for the presence or absence of undesired evaporative emissions may have been conducted on the evaporative emissions system (and not the fuel system) previously (within a threshold duration of the current test), and thus it may be inferred that the evaporative emissions system is free from undesired evaporative emissions. In such an example, it may be pinpointed as to the source of undesired evaporative emissions being the fuel system. However, under circumstances where it is not possible to infer whether the evaporative emissions system is free from undesired evaporative emissions, then it may be indicated that the source of undesired evaporative emissions stems from the one of the fuel system and/or evaporative emissions system. Such an indication may be stored at the controller, for example.

Proceeding to 645, method 600 may include venting the fuel system and evaporative emissions system by deactivating the vacuum pump, and commanding open the CVV. The FTIV may be maintained open while the fuel system and evaporative emissions system is being vented. In some examples, the fuel system and evaporative emissions system may be vented until the fuel system and evaporative emission system is within a threshold of atmospheric pressure. Responsive to the fuel system and evaporative emissions system coming within the threshold of atmospheric pressure, the fuel system may be sealed by commanding closed the FTIV.

Proceeding to 650, method 600 may include updating vehicle operating conditions. For example, updating vehicle operating conditions at 650 may include setting a malfunction indicator light (MIL) at a dash of the vehicle, alerting the vehicle operator of a request to service the vehicle.

Updating vehicle operating conditions at 650 may in some examples include scheduling the vehicle to operate in an electric-only mode of operation as frequently as possible, to avoid operation of the fuel pump which may increase fuel vaporization, and which may further increase potential for the fuel vapors to escape to atmosphere via the source of undesired evaporative emissions. Method 600 may then end.

Returning to 630, responsive to the target vacuum level being reached, method 600 may proceed to 655. At 655, method 600 may include sealing the fuel system and evaporative emissions system by stopping the vacuum pump, and maintaining the CVV closed. The FTIV may be maintained open to diagnose the fuel system and evaporative emissions system in a combined fashion. However, in another example, the vacuum pump may be deactivated, the CVV may be maintained closed, and the fuel system may be sealed from the evaporative emissions system by commanding closed the FTIV. In such an example, pressure in the fuel system and pressure in the evaporative emissions system may be independently monitored as to the presence or absence of undesired evaporative emissions. Such action will be further discussed below.

Accordingly, proceeding to 660, method 600 may include monitoring pressure in the fuel system and evaporative emissions system. If the FTIV is kept open, then pressure may be monitored via either the FTPT (e.g. 291) or another pressure sensor (e.g. 282). However, if the FTIV is commanded closed, then pressure in the fuel system may be monitored via the FTPT (e.g. 291) while pressure in the evaporative emissions system may be monitored via a pressure sensor (e.g. 282) positioned between the FTIV and the canister.

In the event that the fuel system and evaporative emissions system are diagnosed together (e.g. FTIV open), then it may be understood that one pressure bleed-up threshold may be set. The threshold may be a function of ambient temperature, fuel temperature, fuel level, presence or absence of high RVP fuel, presence or absence of rain/puddle conditions or other weather condition that may impact pressure bleed-up, learned/predicted altitude changes, learned/predicted fuel slosh events, etc., as discussed.

In a case where the fuel system and evaporative emissions system are diagnosed separately, it may be understood that in some examples, the pressure bleed-up threshold may be set as the same for each of the fuel system and the evaporative emissions system. Alternatively, in other examples, the pressure bleed-up thresholds may be different. In other words, because the fuel system contains fuel, pressure bleed-up may be expected to be different in some examples than pressure bleed-up in the evaporative emissions system which does not contain liquid fuel. Thus, pressure bleed-up thresholds may be set accordingly.

Furthermore, some of the circumstances that may affect bleed-up as discussed may not substantially affect bleed-up in the evaporative emissions system as compared to the fuel system, under conditions where the fuel system and evaporative emissions system are diagnosed independently. For example, in such a situation high RVP fuel may impact pressure bleed-up of the fuel system, but not the evaporative emissions system. Similarly, fuel slosh event(s) may impact pressure bleed-up in the fuel system, but not the evaporative emissions system, when diagnosed independently via a closed FTIV. Alternatively, an altitude change, for example, an altitude increase, may impact pressure bleed-up in both the sealed fuel system and the sealed evaporative emissions system, under conditions where both are diagnosed independently. Although, in such an example, the extent to which pressure bleed-up is impacted may differ due to the fuel system containing liquid fuel, as opposed to the evaporative emissions system. Accordingly, pressure bleed-up thresholds may be independently adjusted depending on the conditions encountered during the pressure bleed-up portion of the test, as will be discussed below.

While monitoring pressure in the fuel system and evaporative emissions system, method 600 may include proceeding to 665, and may include indicating whether an event is encountered that may impact the pressure bleed-up portion of the evaporative emissions test diagnostic. Such an event may be understood to comprise an increase in altitude, decrease in altitude, one or more fuel slosh events or other disturbances, sudden decrease in pressure due to puddle/rain, etc. If such an event is not indicated, method 600 may proceed to 670. At 670, method 600 may include indicating whether the bleed-up threshold has been reached. In a situation where the fuel system is sealed from the evaporative emissions system for conducting the bleed-up analysis, then at 670 method 600 may include indicating whether a fuel system pressure bleed-up threshold has been reached, and whether an evaporative emissions system bleed-up threshold has been reached. In other words, each system may have its own pressure bleed-up threshold, as discussed. Alternatively, if the fuel system and evaporative emissions system are fluidically coupled, then it may be indicated as to whether a single pressure bleed-up threshold is reached.

If the pressure bleed-up threshold(s) are not reached, then method 600 may proceed to 675. At 675, it may be indicated as to whether a threshold duration has elapsed, the threshold duration comprising a predetermined pressure bleed-up threshold duration. In some examples, the threshold duration for pressure bleed-up thresholds may be adjusted, responsive to events encountered that may impact pressure bleed-up in the fuel system and/or evaporative emissions system.

At 675, if the threshold duration is not indicated to have elapsed, then method 600 may return to 660, where pressure in the fuel system and evaporative emissions system may be continued to be monitored.

Alternatively, returning to 675, if the threshold duration is indicated to have elapsed without the bleed-up threshold(s) (which may be different between the fuel system and evaporative emissions system if they are independently diagnosed) being reached, then method 600 may proceed to 680. At 680, method 600 may include indicating an absence of undesired evaporative emissions. In one example where the fuel system and evaporative emissions system are diagnosed together (e.g. FTIV open), then the absence of undesired evaporative emissions may be indicated for both the fuel system and evaporative emissions system. In another example where the fuel system and evaporative emissions system are diagnosed independently, then either or both of the fuel system and evaporative emissions system may be indicated to be free from undesired evaporative emissions, depending on which system passed the test. Such indications may be stored at the controller, for example.

Proceeding to 645, method 600 may include venting the fuel system and evaporative emissions system. For example, in a case where the fuel system and evaporative emissions system were diagnosed together, the CVV may be commanded open while maintaining open the FTIV, and responsive to pressure in the fuel system and evaporative emissions system being within the threshold of atmospheric pressure, as discussed, the FTIV may be commanded closed. In another example where the fuel system and evaporative emissions system were diagnosed independently, the FTIV and the CVV may be commanded open, and responsive to pressure in the fuel system and evaporative emissions system being within the threshold of atmospheric pressure, the fuel system may be sealed from the evaporative emissions system by commanding closed the FTIV.

Proceeding to 650, method 600 may include updating vehicle operating conditions as a function of the results of the test. In an example where the fuel system and evaporative emissions system are free from undesired evaporative emissions, such a result may be stored at the controller, and vehicle operating conditions may be maintained, as no source of undesired evaporative emissions was identified.

Returning to 670, responsive to the bleed-up threshold being reached, which may include either the combined fuel system and evaporative emissions system, or may refer to either pressure in the fuel system reaching the bleed-up threshold and/or pressure in the evaporative emissions system reaching the respective bleed-up threshold(s), method 600 may proceed to 685. At 685, method 600 may include indicating the presence of undesired evaporative emissions stemming from one of the fuel system and/or evaporative emissions system. Such an indication may be stored at the controller, for example. Proceeding to 645, method 600 may include venting the fuel system and evaporative emissions system, as described above. Proceeding to 650, method 600 may include updating vehicle operating conditions to reflect the indication of the presence of undesired evaporative emissions. In some examples, updating vehicle operating conditions may include scheduling the vehicle controller to operate the vehicle in an electric mode of operation as frequently as possible, to avoid agitation of fuel via the fuel pump, which may increase undesired evaporative emissions under situations where undesired evaporative emissions are indicated in at least the fuel tank. Under conditions where the fuel system is free from undesired evaporative emissions, but where the evaporative emissions system is indicated as having a presence of undesired evaporative emissions, then updating operating conditions at 650 may include maintaining the fuel system sealed as frequently as possible, to avoid introducing fuel vapors to the evaporative emissions system. Furthermore, the vehicle may be commanded to operate in the electric mode as frequently as possible, to avoid refueling events where the fuel system may be coupled to the evaporative emissions system. Still further, updating vehicle operating conditions at 650 may include setting a MIL, alerting the vehicle operator of a request to service the vehicle in response to the indicated presence of undesired evaporative emissions. Method 600 may then end.

Returning to 665, responsive to an indication of an event(s) which may impact the pressure bleed-up portion of the test, method 600 may proceed to 690. At 690, method 600 may include adjusting pressure bleed-up threshold(s) as a function of the event. More specifically, in response to a fuel slosh event, the disturbance to the pressure bleed-up may be allowed to stabilize, and then the pressure bleed-up threshold may be dynamically adjusted to a level less negative than the previous threshold.

In another example, in response to the vehicle traveling through an altitude change that includes an altitude increase, the pressure bleed-up threshold may be adjusted to account for the pressure bleed-up due to the altitude change. In other words, the pressure bleed-up threshold may be dynamically adjusted as a function of the altitude change, to a level less negative than the previous threshold.

It may be understood that, for such examples as fuel slosh and altitude increases during the pressure bleed-up portion of the evaporative emissions test, dynamically adjusting the pressure bleed-up threshold may be possible due to the variable target vacuum applied on the fuel system and/or evaporative emissions system. In other words, if deeper vacuum as compared to the basal vacuum (e.g. −8InH2O) were not applied under conditions where fuel slosh and/or altitude increase is learned/predicted to occur, then there may not be enough signal-to-noise to dynamically adjust the thresholds as described.

In still another example, in response to the vehicle traveling through an altitude change that includes an altitude decrease, the pressure bleed-up threshold may be adjusted to account for the altitude decrease countering the pressure build. In other words, by decreasing in altitude, the pressure build may be less than it would otherwise be in a situation where the vehicle did not decrease in altitude. Accordingly, in such an example, the pressure bleed-up threshold may be dynamically adjusted to a level more negative than the previous threshold.

In yet another example, if a condition is encountered such as sudden rain, driving through a puddle, etc., that results in a sudden decrease in pressure in the fuel system and/or evaporative emissions system, then similar to that of the fuel slosh case, the disturbance to the pressure may be allowed to stabilize, and the pressure bleed-up threshold may be adjusted to a level more negative than the previous threshold.

Subsequent to adjusting the bleed-up threshold, method 600 may return to 660 and may include continuing to monitor pressure in the fuel system and evaporative emissions system, as discussed. Furthermore, the rest of the steps of method 600 have been described above, and the only modification to the steps include the adjusted bleed-up thresholds. Thus, each step following 660 subsequent to dynamically adjusting pressure bleed-up thresholds will not be described in detail, for brevity. Briefly, subsequent to adjusting the pressure bleed-up thresholds, method 600 may include monitoring pressure in the fuel system and/or evaporative emissions system, and indicating undesired evaporative emissions responsive to the pressure bleed-up threshold(s) being reached, and indicating the absence of undesired evaporative emissions responsive to the pressure bleed-up thresholds not being reached. Subsequent to such determinations, the fuel system and evaporative emissions system may be vented, and then the fuel system may be sealed, and vehicle operating conditions may be updated according to the results of the test diagnostic. Method 600 may then end.

Thus, the method of FIGS. 5-6 may enable a method comprising conducting a test diagnostic via evacuating a fuel system and an evaporative emissions system of a vehicle to a variable vacuum target, then sealing the fuel system and the evaporative emissions system from atmosphere and monitoring a pressure bleed-up in the fuel system and the evaporative emissions system. The method may further include indicating a presence of undesired evaporative emissions stemming from the fuel system and/or evaporative emissions system in response to the pressure bleed-up (or a rate of pressure bleed-up) reaching or exceeding a pressure bleed-up threshold (or a pressure bleed-up rate threshold), where the pressure bleed-up threshold (or pressure bleed-up rate threshold) is dynamically adjusted in response to an indication of one or more conditions that impact the pressure bleed-up (or pressure bleed-up rate).

In an example of the method, the method may further comprise prior to conducting the test diagnostic, learning via a controller routes commonly traveled by the vehicle in order to determine the one or more conditions that impact the pressure bleed-up. In such an example, the one or more conditions that impact the pressure bleed-up may comprise one or more learned events including fuel slosh events and/or altitude changes. Furthermore, dynamically adjusting the pressure bleed-up threshold may include adjusting the pressure bleed-up threshold as a function of the one or more learned events, and the variable vacuum target may further be a function of the one or more learned events.

Such a method may further comprise, at a time prior to and within a threshold duration of conducting the test diagnostic, with the vehicle stationary, venting the fuel system and then sealing the fuel system and monitoring pressure in the sealed fuel system for a predetermined duration, in order to determine a reid vapor pressure of a fuel stored in the fuel system. In such an example, dynamically adjusting the pressure bleed-up threshold may include adjusting the pressure bleed-up threshold as a function of the reid vapor pressure of the fuel stored in the fuel system, and where the variable vacuum target is further a function of the reid vapor pressure of the fuel stored in the fuel system.

In such a method, dynamically adjusting the pressure bleed-up threshold may include adjusting the pressure bleed-up threshold in response to a sudden drop in pressure in the fuel system and/or evaporative emissions system during the pressure bleed-up.

In such a method, sealing the fuel system and the evaporative emissions system from atmosphere and monitoring the pressure bleed-up in the fuel system and the evaporative emissions system may include monitoring a single pressure bleed-up under conditions where the fuel system is fluidically coupled to the evaporative emissions system upon sealing the fuel system and evaporative emissions system, and where dynamically adjusting the pressure bleed-up threshold includes dynamically adjusting a single pressure bleed-up threshold. In such an example, where sealing the fuel system and the evaporative emissions system from atmosphere and monitoring the pressure bleed-up in the fuel system and the evaporative emissions system includes monitoring two separate pressure bleed-ups including a fuel system pressure bleed-up and an evaporative emissions system pressure bleed-up, dynamically adjusting the pressure bleed-up threshold may include dynamically adjusting a fuel system pressure bleed-up threshold independently of an evaporative emissions system pressure bleed-up threshold, where each pressure bleed-up threshold is a function of the one or more conditions.

A system for a hybrid vehicle may include a fuel system including a steel fuel tank for storing fuel, an evaporative emissions system including a fuel vapor canister, the evaporative emissions system selectively fluidically coupled to the fuel system via a fuel tank isolation valve, and a vent line stemming from the fuel vapor canister, the vent line including a canister vent valve configured to selectively fluidically couple the fuel vapor canister to atmosphere. Such a system may further include an engine, an intake of the engine selectively fluidically coupled to the evaporative emissions system via a canister purge valve, a fuel tank pressure transducer positioned in the fuel system, a vacuum pump positioned in a vacuum pump conduit in parallel with the vent line, a first check valve positioned in the vacuum pump conduit between the vacuum pump and the vent line downstream of the canister vent valve, and a second check valve positioned in the vacuum pump conduit between the vacuum pump and the vent line upstream of the canister vent valve. Such a system may further include a controller storing instructions in non-transitory memory that, when executed, cause the controller to conduct a diagnostic for a presence or an absence of undesired evaporative emissions stemming from the fuel system and/or evaporative emissions system by drawing a target vacuum on the fuel system and evaporative emissions system via the vacuum pump, where drawing the target vacuum includes commanding closed the canister vent valve, commanding closed the canister purge valve, commanding open the fuel tank isolation valve and activating the vacuum pump in a vacuum-mode of operation. Responsive to the target vacuum being reached, the controller may seal the fuel system and the evaporative emissions system from atmosphere via deactivating the vacuum pump, monitor a pressure bleed-up in the fuel system and the evaporative emissions system via the fuel tank pressure transducer and indicate a presence of undesired evaporative emissions stemming from the fuel system and/or the evaporative emissions system responsive to the pressure bleed-up reaching a pressure bleed-up threshold. In such an example, the pressure bleed-up threshold may be dynamically adjusted as a function of one or more conditions encountered during the diagnostic that impact the pressure bleed-up.

Such a system may further include an onboard navigation system and/or a barometric pressure sensor, and a fuel level sensor positioned in the steel fuel tank. In such an example, the controller may store further instructions to learn one or more routes commonly traveled via the vehicle, including learned altitude changes via the onboard navigation system and/or the barometric pressure sensor and learned fuel slosh events via the fuel level sensor along the one or more routes. In such an example, the target vacuum is a variable target vacuum based on whether a learned altitude change and/or one or more fuel slosh events are predicted to occur during the pressure bleed-up in the fuel system and the evaporative emissions system. In such an example, the controller may store further instructions to indicate a loading state of the fuel vapor canister and a volatility of fuel stored in the steel fuel tank, and wherein the variable target vacuum is further a function of the loading state of the fuel vapor canister and the volatility of fuel stored in the steel fuel tank.

In such a system, the system may further comprise a pressure sensor positioned in the evaporative emissions system. The controller may store further instructions to seal the fuel system from the evaporative emissions system via commanding closed the fuel tank isolation valve when sealing the fuel system and the evaporative emissions system. In such an example, monitoring the pressure bleed-up in the fuel system and the evaporative emissions system may include monitoring a fuel system pressure bleed-up via the fuel tank pressure transducer and monitoring an evaporative emissions system pressure bleed-up via the pressure sensor positioned in the evaporative emissions system, wherein the pressure bleed-up threshold comprises a fuel system pressure bleed-up threshold and an evaporative emissions system pressure bleed-up threshold.

In still another example of such a system, the controller may store further instructions to dynamically adjust the fuel system pressure bleed-up threshold and the evaporative emissions system pressure bleed-up threshold independently of one another, responsive to the one or more conditions encountered during the diagnostic.

Turning now to FIG. 7, an example timeline 700 is shown for evacuating a fuel system and evaporative emissions system to a variable vacuum level, and for adjusting a pressure bleed-up threshold, as a result of an indication of high RVP fuel in the fuel tank. Timeline 700 includes plot 705, indicating whether conditions are indicated to be met for conducting an evaporative emissions test diagnostic, or evap test. Timeline 700 further includes plot 710, indicating a status of a CVV (e.g. 297), and plot 715, indicating a status of a FTIV (e.g. 252), over time. The CVV and the FTIV may either be open (e.g. fully open), or closed (e.g. fully closed), over time. Timeline 700 further includes plot 720, indicating a status of a vacuum pump (e.g. 289), over time. The vacuum pump may be either on, or off, over time. Timeline 700 further includes plot 725, indicating pressure in the fuel system and evaporative emissions system, monitored by a FTPT (e.g. 291), over time. In this example timeline, pressure in the fuel system and evaporative emissions system may be either at atmospheric pressure, or may be negative (−) with respect to atmospheric pressure. For plot 725, line 727 represents a target vacuum if high RVP fuel were not identified to be present in the vehicle fuel tank, and line 726 represents pressure in the fuel system and evaporative emissions system if reduced to target vacuum represented by line 727. Alternatively, line 729 represents a target vacuum provided that high RVP is identified to be present in the vehicle fuel tank. Further, line 730 represents a pressure bleed-up threshold. A difference 728 between line 727 and line 730 is indicated to be less than another difference 731 between line 729 and 730. This is due to the identification of the high RVP fuel, and is a function of factoring in the expected or predicted pressure rise due to the high RVP fuel, to establish the pressure bleed-up threshold represented by line 730. Timeline 700 further includes plot 735, indicating the presence (yes) or absence (no) of undesired evaporative emissions stemming from the fuel system and/or evaporative emissions system, over time. Timeline 700 further includes plot 740, indicating whether high RVP fuel is indicated in the fuel tank, over time.

At time t0, conditions are not indicated to be met for conducting the evaporative emissions test diagnostic (plot 705). The CVV is open (plot 710), the FTIV is closed (plot 715), and the vacuum pump is deactivated (plot 720). Furthermore, pressure in the fuel system is indicated to be near atmospheric pressure. As discussed, such pressure in the fuel system may in some examples be indicative of a fuel system with a source of undesired evaporative emissions. However, such a pressure may also reflect a point in time in a diurnal cycle, where conditions are such that pressure in the sealed fuel system is near atmospheric pressure. Furthermore, undesired evaporative emissions have not been indicated for either the fuel system or the evaporative emissions system (plot 735). Still further, high RVP fuel is indicated in the vehicle fuel tank, where such a determination may be made via the carrying out the method depicted at FIG. 5.

At time t1, conditions are indicated to be met for conducting the evaporative emissions test diagnostic (plot 705). Accordingly, the FTIV is commanded open (plot 715), the CVV is commanded closed (plot 710), and the vacuum pump is actuated to apply a negative pressure on the fuel system and evaporative emissions system. An amount of negative pressure applied on the fuel system and evaporative emissions system may comprise a target vacuum, which may be determined as a function of the RVP of the fuel stored in the fuel tank of the vehicle. More specifically, the target vacuum may be made more negative (line 729) based an indication of high RVP fuel, as compared to the target vacuum (line 727) if the fuel did not comprise high RVP fuel.

With the vacuum pump activated at time t1, pressure in the fuel system and evaporative emissions system is reduced between time t1 and t2. At time t2, the target vacuum (line 729) is reached. Accordingly, the vacuum pump is commanded off, or deactivated (plot 720), the CVV is maintained closed (plot 710), and the FTIV is maintained open (plot 715).

With the vacuum pump off and with the CVV maintained closed, it may be understood that the fuel system and evaporative emissions system are sealed from atmosphere. Accordingly, pressure in the fuel system and evaporative emissions system may be monitored as to whether pressure bleed-up reaches the pressure bleed-up threshold, represented by line 730. It may be understood that the pressure bleed-up threshold represented by line 730 is based on the target vacuum, and includes adjusting the threshold such that the threshold takes into account the expected pressure build due solely to the high RVP fuel.

Thus, between time t2 and t3, pressure in the fuel system and evaporative emissions system is monitored, and at time t3 the predetermined duration for monitoring the pressure bleed-up portion of the evaporative emissions test elapses. Because the pressure bleed-up did not reach the pressure bleed-up threshold (line 730), undesired evaporative emissions are not indicated for the fuel system and evaporative emissions system (plot 735). Such a result may be stored at the controller, as discussed.

At time t3, with the absence of undesired evaporative emissions indicated, conditions are no longer indicated to be met for conducting the test diagnostic (plot 705). Thus, the CVV is commanded open, and the FTIV is maintained open, to vent the fuel system and evaporative emissions system. Accordingly, between time t3 and t4, pressure in the fuel system and evaporative emissions system returns to atmospheric pressure (plot 725). With pressure at atmospheric pressure, the FTIV is commanded closed (plot 715) at time t4. Between time t4 and t5, the vehicle is maintained in its current operational state.

Turning now to FIG. 8, an example timeline 800 for conducting an evaporative emissions test diagnostic under conditions where one or more fuel slosh events are predicted/learned to potentially occur during a pressure bleed-up portion of the evaporative emissions test. More specifically, a target vacuum may be variable as a function of whether or not fuel slosh event(s) are predicted/learned for a particular route the vehicle is traveling, and a pressure bleed-up threshold may be dynamically adjusted in response to such a fuel slosh event or events. Timeline 800 includes plot 805 indicating whether conditions are indicated to be met for conducting an evaporative emissions test diagnostic, or evap test. Timeline 800 further includes plot 810, indicating a status of a CVV (e.g. 297), and plot 815, indicating a status of a FTIV (e.g. 252), over time. The CVV and the FTIV may either be open (e.g. fully open), or closed (e.g. fully closed), over time. Timeline 800 further includes plot 820, indicating a status of a vacuum pump (e.g. 289), over time. The vacuum pump may be either on, or off, over time. Timeline 800 further includes plot 825, indicating pressure in the fuel system and evaporative emissions system, monitored by a FTPT (e.g. 291), over time. In this example timeline, pressure in the fuel system and evaporative emissions system may be either at atmospheric pressure, or may be negative (−) with respect to atmospheric pressure. For plot 825, line 827 represents a target vacuum if learned/predicted fuel slosh event(s) are not expected to occur during a pressure bleed-up portion of the evaporative emissions test diagnostic, and line 826 represents pressure in the fuel system and evaporative emissions system if reduced to the target vacuum represented by line 827. Alternatively, line 828 represents a target vacuum provided that one or more fuel slosh events are learned/predicted to potentially occur during the pressure bleed-up portion of the test diagnostic. Furthermore, line 829 represents a pressure bleed-up threshold set as a function of the target vacuum (represented by line 828), which as discussed above may further be a function of ambient temperature, fuel level, etc. Line 830 thus represents a dynamically adjusted pressure bleed-up threshold, understood to be adjusted from the pressure bleed-up threshold represented by line 829 to the pressure bleed-up threshold represented by line 830. Timeline 800 further includes plot 835, indicating whether undesired evaporative emissions are present in the fuel system and evaporative emissions system (yes) or not (no), over time. Timeline 800 further includes plot 840, indicating whether high RVP fuel is indicated in the fuel tank of the vehicle or not, over time.

At time t0, conditions are not indicated to be met for conducting the evaporative emissions test diagnostic (plot 805). The CVV is open (plot 810), the FTIV is closed (plot 815), and the vacuum pump is off (plot 820). Pressure in the fuel system, as monitored by the FTPT (e.g. 291), is near atmospheric pressure. As discussed above, in cases where the fuel system is sealed and near atmospheric pressure, there may be a source of undesired evaporative emissions present in the fuel system. Alternatively, another explanation may be that ambient conditions and vehicle operating conditions are such that the fuel system is not holding positive or negative pressure with respect to atmospheric pressure. Furthermore, undesired evaporative emissions are not indicated for the fuel system and evaporative emissions system (plot 835), and high RVP fuel is not indicated to be present in the fuel system (plot 840).

At time t1, conditions are indicated to be met for conducting the evaporative emissions test diagnostic (plot 805). Accordingly, the CVV is commanded closed (plot 810), the FTIV is commanded open (plot 815), and the vacuum pump is activated (plot 820) to apply negative pressure on the fuel system and evaporative emissions system. The amount of vacuum to apply on the fuel system and evaporative emissions system, or target vacuum, is a function of the learned/predicted fuel slosh events which may potentially occur during the pressure bleed-up portion of the test, as discussed above. Thus, with conditions met at time t1, the controller may consult or query one or more lookup tables that include information related to a desired target vacuum to draw on the fuel system and evaporative emissions system as a function of learned/predicted fuel slosh events. Furthermore, as discussed, such a target vacuum may further be a function of canister loading state, ambient temperature, etc. As high RVP fuel is not indicated, compensation for high RVP fuel may not be taken into account. Further, while not explicitly illustrated, it may be understood that there is no indicated rain/puddle condition, and no indicated altitude change that is expected or predicted to occur during the pressure bleed-up portion of the diagnostic. Accordingly, between time t1 and t2, pressure in the fuel system and evaporative emissions system decreases to the target vacuum represented by line 828. At time t2, the pressure reaches the target vacuum. With the target vacuum reached at time t2, the vacuum pump is deactivated (plot 820), the CVV is maintained closed (plot 810), and the FTIV is maintained open (plot 815).

With the fuel system and evaporative emissions system sealed via the deactivation of the vacuum pump, pressure bleed-up is monitored as to whether pressure bleed-up in the fuel system and evaporative emissions system reaches the pressure bleed-up threshold represented by line 829. Pressure bleed-up may be monitored for a predetermined threshold duration, for example. However, between time t2 and t3, there is a fuel slosh event, represented as a disturbance to the pressure bleed-up. Accordingly, in response to the indicated fuel slosh event, the pressure bleed-up threshold is dynamically adjusted to the pressure bleed-up threshold represented by line 830. It may be understood that the pressure bleed-up threshold represented by line 830 is set after the fuel slosh disturbance stabilizes.

With the pressure bleed-up threshold dynamically adjusted to the pressure bleed-up threshold represented by line 830, pressure bleed-up in the fuel system and evaporative emissions system is again monitored between time t3 and t4. In one example, pressure bleed-up may be monitored for the same duration as the predetermined threshold duration prior to the fuel slosh event, or may comprise a shorter duration in some examples.

Between time t3 and t4, pressure bleed-up remains below the pressure bleed-up threshold (line 830), and at time t4, the predetermined threshold duration elapses. Accordingly, no presence of undesired evaporative emissions is indicated at time t4. In other words, at time t4, the fuel system and evaporative emissions system are indicated to be free from the presence of undesired evaporative emissions. The result is stored at the controller.

With the test results indicated at time t4, conditions are no longer indicated to be met for conducting the evaporative emissions test diagnostic (plot 805). Accordingly, to vent the pressure in the fuel system and evaporative emissions system, the CVV is commanded open. Between time t4 and t5, pressure in the fuel system and evaporative emissions system returns to atmospheric pressure. At time t5 the FTIV is commanded closed. Between time t5 and t6, pressure in the fuel system and evaporative emissions system remains near atmospheric pressure.

Thus, it may be understood that, in example timeline 800, if the pressure bleed-up threshold were not adjusted responsive to the fuel slosh event or pressure disturbance, then the pressure disturbance would have resulted in the pressure bleed-up exceeding the pressure bleed-up threshold represented by line 829. In such an example, the fuel system and evaporative emissions system would have been incorrectly diagnosed as having a source of undesired evaporative emissions. By dynamically adjusting the pressure bleed-up threshold in response to the fuel slosh event, the fuel system and evaporative emissions system is correctly diagnosed as being free from undesired evaporative emissions.

Turning now to FIG. 9, an example timeline 900 is shown for conducting an evaporative emissions test diagnostic under conditions where an altitude change is learned/predicted to potentially occur during a pressure bleed-up portion of the evaporative emissions test. More specifically, a target vacuum for such a test may be variable as a function of whether or not an altitude change is learned/predicted for a particular route the vehicle is traveling, and a pressure bleed-up threshold may be dynamically adjusted in response to such an event.

Timeline 900 includes plot 905 indicating whether conditions are indicated to be met for conducting an evaporative emissions test diagnostic, or evap test. Timeline 900 further includes plot 910, indicating a status of a CVV (e.g. 297), and plot 915, indicating a status of a FTIV (e.g. 252), over time. The CVV and the FTIV may either be open (e.g. fully open), or closed (e.g. fully closed), over time. Timeline 900 further includes plot 920, indicating a status of a vacuum pump (e.g. 289), over time. The vacuum pump may be either on, or off, over time. Timeline 900 further includes plot 925, indicating pressure in the fuel system and evaporative emissions system, monitored by a FTPT (e.g. 291), over time. In this example timeline, pressure in the fuel system and evaporative emissions system may be either at atmospheric pressure, or may be negative (−) with respect to atmospheric pressure. For plot 925, line 927 represents a target vacuum if a learned/predicted altitude change is not expected to occur during a pressure bleed-up portion of the evaporative emissions test diagnostic, and line 926 represents pressure in the fuel system and evaporative emissions system if reduced to the target vacuum represented by line 927. Alternatively, line 928 represents a target vacuum provided that an altitude change is learned/predicted to potentially occur during the pressure bleed-up portion of the test diagnostic. Furthermore, line 929 represents a pressure bleed-up threshold set as a function of the target vacuum (represented by line 928), which as discussed above may further be a function of ambient temperature, fuel level, etc. The pressure bleed-up threshold represented by line 929 may be understood to be set based on the altitude change not occurring. Line 930 thus represents a dynamically adjusted pressure bleed-up threshold in response to the altitude change, understood to be adjusted from the pressure bleed-up threshold represented by line 929 to the pressure bleed-up threshold represented by line 930. Timeline 900 further includes plot 935, indicating whether the learned/predicted altitude change occurs, over time. Timeline 900 further includes plot 940, indicating whether undesired evaporative emissions are present in the fuel system and evaporative emissions system (yes) or not (no), over time. Timeline 900 further includes plot 945, indicating whether high RVP fuel is indicated in the fuel tank of the vehicle or not, over time.

At time t0, conditions are not indicated to be met for conducting an evaporative emissions test diagnostic (plot 905). The CVV is open (plot 910), and the FTIV is closed (plot 915). The vacuum pump is off (plot 920). Pressure in the fuel system and evaporative emissions system is near atmospheric pressure (plot 925). As discussed, such a pressure in a sealed fuel system may be indicative of a source of undesired evaporative emissions, or may be a function of current vehicle operating conditions and ambient temperature. The vehicle is at a particular altitude (plot 935). The altitude may be inferred from an onboard navigation system (e.g. GPS), for example. Undesired evaporative emissions are not indicated for the fuel system and evaporative emissions system (plot 940), and high RVP fuel is not indicated to be present in the fuel system (plot 945).

At time t1, conditions are indicated to be met for conducting the evaporative emissions test diagnostic. Accordingly, the FTIV is commanded open (plot 915), the CVV is commanded closed (plot 910), and the vacuum pump is activated (plot 920) to draw a negative pressure or vacuum on the fuel system and evaporative emissions system. The target vacuum is a function of a learned/predicted altitude change inferred to potentially occur during a pressure bleed-up portion of the test diagnostic. In other words, responsive to conditions being met for conducting the diagnostic, one or more lookup tables may be queried in order to determine a desired target vacuum as a function of the learned/predicted altitude change. The desired target vacuum may be a function of the extent or magnitude of altitude change, a rate of altitude change, a duration of the altitude change, etc. As discussed, the target vacuum may further be a function of canister loading state, ambient temperature, fuel level, fuel temperature, etc.

Thus, for example timeline 900 it may be understood that the target vacuum is set to the target vacuum represented by line 928. Accordingly, between time t1 and t2, pressure in the fuel system and evaporative emissions system is reduced via the vacuum pump to the target vacuum. At time t2, the target vacuum is reached. Accordingly, the vacuum pump is deactivated (plot 920). With the vacuum pump deactivated and the CVV maintained closed (plot 910), it may be understood that the fuel system and evaporative emissions system are sealed from atmosphere.

Between time t2 and t3, pressure bleed-up in the fuel system and evaporative emissions system is monitored (plot 925). Furthermore, altitude is monitored, for example via the onboard navigation system, or in some examples via a barometric pressure sensor. The altitude change (and vehicle location) is monitored in order to determine if the altitude change corresponds to the learned/predicted altitude change. It may be understood that, for example timeline 900, the altitude change corresponds to the learned/predicted altitude change. Furthermore, the altitude change comprises an increase in altitude. Accordingly, based on the learned/predicted altitude change, the pressure bleed-up threshold is dynamically adjusted from the pressure bleed-up threshold represented by line 929, to the pressure bleed-up threshold represented by line 930. It may be understood that, in the event of a decrease in altitude, in some examples the pressure bleed-up threshold may similarly be adjusted, but adjusted in the opposite direction (e.g. more negative rather than less negative), as a function of the magnitude or extent of altitude decrease.

With the pressure bleed-up threshold dynamically adjusted between time t2 and t3, pressure bleed-up is continued to be monitored, and at time t3, a predetermined duration for conducting the pressure bleed-up portion of the test elapses. As the pressure bleed-up in the fuel system and evaporative emissions system did not reach or exceed the dynamically adjusted pressure bleed-up threshold represented by line 930, an absence of undesired evaporative emissions is indicated. Such a result is stored at the controller.

With the absence of undesired evaporative emissions indicated at time t3, conditions are no longer indicated to be met for conducting the test diagnostic (plot 905). Accordingly, the CVV is commanded open (plot 910) to vent the pressure in the fuel system and evaporative emissions system. Between time t3 and t4, pressure in the fuel system and evaporative emissions system thus returns to near atmospheric pressure (plot 925). With pressure in the fuel system and evaporative emissions system near atmospheric pressure, the FTIV is commanded closed (plot 915). Between time t4 and t5, pressure in the sealed fuel system increases, the result of the continued ascent (plot 935).

Thus, it may be understood that, for example timeline 900, if the pressure bleed-up threshold were not dynamically adjusted in response to the learned/predicted altitude change, then the pressure in the fuel system and evaporative emissions system would have exceeded the pressure bleed-up threshold represented by line 929. In other words, undesired evaporative emissions would have been incorrectly indicated for the fuel system and evaporative emissions system. By dynamically adjusting the pressure bleed-up threshold as a function of the learned/predicted altitude change, the fuel system and evaporative emissions system were correctly indicated as being free from undesired evaporative emissions.

The dynamic adjusting of the pressure bleed-up threshold is enabled for timeline 900 as a result of the variable target vacuum. In other words, because the target vacuum was deeper (e.g. more negative) than if the learned/predicted altitude change was not indicated, the signal-to-noise allowed for adjusting the pressure bleed-up threshold.

However, in some examples, there may not be an indication of a learned/predicted altitude change. For example, a vehicle may not have an onboard navigation system, or the navigation system may be faulty. In another example, the vehicle may be traveling a route that has not been learned. In such an example, in response to a request to conduct an evaporative emissions test diagnostic, learned/predicted altitude change may not be utilized to determine target vacuum. Thus, the target vacuum may comprise a basal target vacuum (e.g. −8InH2O). In such an example, an altitude change may be detected during the pressure bleed-up portion of the test, via for example a barometric pressure sensor. Based on the extent of the altitude change, the pressure bleed-up threshold may be dynamically adjusted, provided there is enough signal-to-noise. For example, with the basal target vacuum drawn on the fuel system and evaporative emissions system, a smaller altitude change may be compensated for by slightly dynamically adjusting the pressure bleed-up threshold, whereas a large altitude change may not be able to be compensated for due to the lack of sufficient signal-to-noise to enable adjusting of the pressure bleed-up threshold.

Furthermore, while not specifically illustrated, in some examples responsive to a learned/predicted decrease in altitude for a particular learned route, the decrease in altitude may be utilized as a means for drawing the negative pressure on the fuel system and evaporative emissions system. For example, in response to a request for an evaporative emissions test diagnostic, the vehicle controller may indicate whether a learned/predicted decrease in altitude is expected for the particular drive cycle. If so, then the controller may schedule the fuel system and evaporative emissions system to be sealed during the descent, which may result in a negative pressure build over the course of the descent. Similar to that discussed above, a target vacuum may be determined for such a test, and if the target vacuum is reached prior to the end of the descent, then the fuel system and evaporative emissions system may be vented (e.g. duty cycle the CVV with the FTIV open, or duty cycle the FTIV with the CVV open), to maintain the target vacuum until it is indicated that the vehicle has reached the end of the descent. Alternatively, if the target vacuum is not reached by the end of the descent, then the vacuum pump may be utilized to evacuate the fuel system and evaporative emissions system to achieve the target vacuum. In this way, energy use may be reduced by utilizing the descent as a way to evacuate the fuel system and evaporative emissions system, rather than solely activating the vacuum pump to achieve the target vacuum. Such reduction in energy use may improve fuel economy for hybrid vehicles.

Turning now to FIG. 10, an example timeline 1000 is shown for conducting an evaporative emissions test diagnostic under conditions where a rain/puddle condition is detected during a pressure bleed-up portion of the test. More specifically, responsive to an indication of a pressure drop during a pressure bleed-up portion of the test diagnostic, the pressure drop corresponding to a rain/puddle condition, for example, a pressure bleed-up threshold may be dynamically adjusted to account for the disturbance to the pressure bleed-up.

Timeline 1000 includes plot 1005 indicating whether conditions are indicated to be met for conducting an evaporative emissions test diagnostic, or evap test. Timeline 900 further includes plot 1010, indicating a status of a CVV (e.g. 297), and plot 915, indicating a status of a FTIV (e.g. 252), over time. The CVV and the FTIV may either be open (e.g. fully open), or closed (e.g. fully closed), over time. Timeline 1000 further includes plot 1020, indicating a status of a vacuum pump (e.g. 289), over time. The vacuum pump may be either on, or off, over time. Timeline 1000 further includes plot 1025, indicating pressure in the fuel system and evaporative emissions system, monitored by a FTPT (e.g. 291), over time. In this example timeline, pressure in the fuel system and evaporative emissions system may be either at atmospheric pressure, or may be negative (−) with respect to atmospheric pressure. For plot 1025, line 1028 represents a target vacuum to be drawn on the fuel system and evaporative emissions system. In this example timeline, the target vacuum may be understood to comprise −8InH2O, or in other words, the basal target vacuum. Line 1029 represents a pressure bleed-up threshold, set as a function of the target vacuum. Line 1030 represents another pressure bleed-up threshold, adjusted from the pressure bleed-up threshold represented by line 1029, in response to a sudden drop in pressure during a pressure bleed-up portion of the test diagnostic.

Timeline 1000 further includes plot 1035, indicating altitude of the vehicle, over time. Timeline 1000 further includes plot 1040, indicating whether undesired evaporative emissions are present in the fuel system and evaporative emissions system (yes) or not (no), over time. Timeline 1000 further includes plot 1045, indicating whether high RVP fuel is indicated in the fuel tank of the vehicle or not, over time.

At time t0, conditions are not indicated to be met for conducting an evaporative emissions test diagnostic (plot 1005). The CVV is open (plot 1010), the FTIV is closed (plot 1015), and the vacuum pump is off (plot 1020). The fuel system is near atmospheric pressure (plot 1025). As discussed, such a condition where the sealed fuel system is near atmospheric pressure may be related to a source of undesired evaporative emissions present in the fuel system, or may be related to current vehicle operating conditions in combination with ambient temperature. The vehicle is at a particular altitude (plot 1035), undesired evaporative emissions are not indicated for the fuel system and evaporative emissions system (plot 1040), and high RVP fuel is not indicated to be stored in the fuel system (plot 1045).

At time t1, conditions are indicated to be met for conducting the evaporative emissions test diagnostic (plot 1005). Accordingly, the CVV is commanded closed (plot 1010), the FTIV is commanded open (plot 1015), and the vacuum pump is activated to draw a negative pressure on the fuel system and evaporative emissions system. It may be understood that, at time t1, the controller may query one or more lookup tables to determine whether to variably adjust the target vacuum, as a function of whether or not an altitude change or fuel slosh event(s) are learned/predicted to occur during a pressure bleed-up portion of the test diagnostic, whether there is a presence of high RVP fuel in the fuel system, etc. In this example, conditions are not such that a variable vacuum is desired or requested, and instead the target vacuum is set as the basal target vacuum (e.g. −8InH2O).

Between time t1 and t2, pressure in the fuel system and evaporative emissions system is reduced (plot 1025). At time t2, the target vacuum is reached. Accordingly, the fuel system and evaporative emissions system are sealed from atmosphere, via the deactivation of the vacuum pump (plot 1020). Furthermore, the pressure bleed-up threshold (line 1029) is set as a function of one or more of ambient temperature, fuel volatility, fuel level, etc. Between time t2 and t3, pressure bleed-up in the fuel system and evaporative emissions system is monitored as to whether the pressure bleed-up reaches or exceeds the pressure bleed-up threshold (line 1029). However, at time t3, there is a sudden decrease in the pressure in the fuel system and evaporative emissions system, indicative of a rain/puddle event. For example, if the vehicle drives through a puddle that soaks the fuel tank, the fuel tank may cool significantly, which may result in the pressure drop. Accordingly, in response to such an indication at time t3, the pressure bleed-up threshold is dynamically adjusted to a pressure bleed-up threshold (line 1030) that is more negative than the initial pressure bleed-up threshold (line 1029). In other words, in response to the sudden decreased pressure, if the pressure bleed-up threshold were not adjusted, then the fuel system and evaporative emissions system may be indicated to be free from undesired evaporative emissions, when in fact that is not the case.

Accordingly, with the pressure bleed-up threshold adjusted to the more negative threshold (line 1030), pressure bleed-up in the fuel system and evaporative emissions system is again monitored. At time t4, pressure bleed-up reaches the pressure bleed-up threshold (line 1030). Accordingly, undesired evaporative emissions are indicated for the fuel system/evaporative emissions system (plot 1040).

With undesired evaporative emissions indicated to be stemming from the fuel system and/or evaporative emissions system, the result is stored at the controller. Further, conditions are no longer indicated to be met for conducting the diagnostic (plot 1005). Accordingly, the CVV is commanded open (plot 1010), to vent the pressure in the fuel system and evaporative emissions system. Accordingly, between time t4 and t5, pressure in the fuel system and evaporative emissions system returns to atmospheric pressure (plot 1025). At time t5, the fuel system is sealed via closing the FTIV (plot 1015). Between time t5 and t6, pressure in the fuel system and evaporative emissions system remains near atmospheric pressure.

Thus, by dynamically adjusting the pressure bleed-up threshold in response to the sudden drop in pressure, undesired evaporative emissions were correctly indicated for timeline 1000, whereas if the threshold were not dynamically adjusted to the threshold represented by line 1030, then the pressure bleed-up would have remained below the pressure bleed-up threshold (line 1029).

The timelines of FIGS. 7-10 depict examples where the fuel system and evaporative emissions system are diagnosed together. While not specifically discussed with regard to FIGS. 7-10, the ability to seal the fuel system from the evaporative emissions system via closing the FTIV may enable the evaporative emissions system to be diagnosed separately from the fuel system. Thus, in some examples, the evaporative emissions system may be known to be free from undesired evaporative emissions due to a test having been conducted within a threshold duration (e.g. within 1 hour or less, 3 hours or less, 8 hours or less, 24 hours or less, etc.) of conducting the diagnostic on the fuel system. Thus, with regard to the timelines of FIGS. 7-10, if it is known that the evaporative emissions system is free from undesired evaporative emissions, then any indication of undesired evaporative emissions may be understood to relate to undesired evaporative emissions stemming from the fuel system.

In another example, the ability to seal the fuel system and evaporative emissions system may enable diagnosis of the fuel system and evaporative emissions system independently, at the same time. In such an example, pressure bleed-up thresholds may be additionally adjusted (or not) independently. Such an example of diagnosing the fuel system and evaporative emissions system simultaneously may be desirable as doing so may pinpoint a source of undesired evaporative emissions (fuel system and/or evaporative emissions system), and may further reduce use of energy stored at an onboard energy storage device in evacuating the fuel system and evaporative emissions system, via conducting the test for both the fuel system and the evaporative emissions system at the same time.

Accordingly, turning to FIG. 11, an example timeline 1100 for simultaneously and independently conducting an evaporative emissions test diagnostic on the fuel system and evaporative emissions system, is shown. More specifically, example timeline 1100 illustrates a situation in which a learned/predicted fuel slosh event is expected to occur during a pressure bleed-up portion of the evaporative emissions test diagnostic, and where the fuel system and evaporative emissions system are independently diagnosed. In such an example, a variable vacuum target may be applied to the fuel system and evaporative emissions system, then the fuel system may be sealed from the evaporative emissions system (and the evaporative emissions system sealed from atmosphere). Pressure bleed-up may be independently monitored for both the fuel system and for the evaporative emissions system. Under circumstances where a fuel slosh event is detected during the pressure bleed-up portion of the test, then the pressure bleed-up threshold for the fuel system (fuel system pressure bleed-up threshold) may be adjusted, but the pressure bleed-up threshold for the evaporative emissions system (evap system pressure bleed-up threshold), may not be adjusted. In other words, because the fuel system is not fluidically coupled (e.g. FTIV closed), the fuel slosh event may not result in increased bleed-up for the evaporative emissions system, compared to the fuel system. Such action will be further discussed below with regard to timeline 1100.

Timeline 1100 includes plot 1105, indicating whether conditions are met for conducting the evaporative emissions test diagnostic, and plot 1110, indicating a status of a vacuum pump (e.g. 289) (on or off), over time. Timeline 1100 further includes plot 1115, indicating a status (open or closed) of the CVV, and plot 1120, indicating a status (open or closed) of the FTIV, over time. Timeline 1100 further includes plot 1125, indicating pressure in the evaporative emissions system, monitored via a pressure sensor positioned in the evaporative emissions system (e.g. 282), also referred to as evap pressure sensor, over time. Line 1127 indicates a target vacuum under conditions where a variable target vacuum is not desired (e.g. no learned/predicted fuel slosh events, altitude changes, etc., during the pressure bleed-up portion of the test), and line 1126 thus represents pressure in the evaporative emissions system if the target vacuum comprises the vacuum represented by line 1127. Line 1128 thus represents a target vacuum under conditions where the variable target vacuum is desired. Line 1129 represents an evap system pressure bleed-up threshold, set as a function of the target vacuum represented by line 1128, and which may be further based on ambient temperature, fuel level, fuel volatility, etc.

Timeline 1100 further includes plot 1130, indicating pressure in the fuel system as monitored via, for example, a fuel tank pressure transducer (e.g. 291), over time. Line 1132 represents a target vacuum under conditions where a variable target vacuum is not desired, and line 1131 thus represents pressure in the fuel system if the target vacuum comprises the vacuum represented by line 1132. Line 1133 thus represents a target vacuum under conditions where the variable target vacuum is desired. Line 1134 represents a fuel system pressure bleed-up threshold, set as a function of the target vacuum represented by line 1133, and which may be further based on ambient temperature, fuel level, fuel volatility, etc. Line 1135 represents a dynamically adjusted fuel system pressure bleed-up threshold.

Timeline 1100 further includes plot 1140, indicating whether undesired evaporative emissions are present in the fuel system, and plot 1145, indicating whether undesired evaporative emissions are present in the evaporative emissions system, over time.

At time t0, conditions are not indicated to be met for conducting the evaporative emissions test diagnostic (plot 1105). The vacuum pump is off (plot 1110), the CVV is open (plot 1115), and the FTIV is closed (plot 1120). Pressure in the evaporative emissions system is near atmospheric pressure (plot 1125), as is pressure in the fuel system (plot 1130). As discussed, pressure near atmospheric pressure in the sealed fuel system (FTIV closed) may be indicative of a source of undesired evaporative emissions stemming from the fuel system, or may be a function of current operating conditions and ambient temperature. Furthermore, there is no prior indication of undesired evaporative emissions stemming from the fuel system (plot 1140) or evaporative emissions system (plot 1145).

At time t1, conditions are indicated to be met for conducting the evaporative emissions test diagnostic (plot 1105). With conditions being met, it may be understood that the controller may query one or more lookup tables, in order to determine whether to evacuate the fuel system and evaporative emissions system to a variable vacuum target. For example timeline 1100, it may be understood that a learned/predicted fuel slosh event is expected to potentially occur during a pressure bleed-up portion of the test. Thus, a variable vacuum target is desired, represented by line 1128 and 1133. It may be understood that in such an example, the variable vacuum target applies to the evaporative emissions system simply because in the course of evacuating the fuel system to the variable vacuum target, the evaporative emissions system will also be evacuated to the variable vacuum target, due to the position of the vacuum pump (e.g. 289). Thus, it may be understood that both line 1128 and line 1133 represent the same variable vacuum target. While not explicitly illustrated, the variable vacuum target may further be a function of canister loading state and ambient temperature, as discussed above.

With the variable vacuum target(s) set, pressure bleed-up thresholds may also be set for the evaporative emissions system (line 1127) and fuel system (line 1134). The evap system pressure bleed-up threshold may be independent of fuel volatility, as the fuel system is sealed from the evaporative emissions system. Alternatively, the fuel system pressure bleed-up threshold may be a function of fuel volatility.

With the variable vacuum target determined, and the pressure bleed-up thresholds determined, at time t1 the CVV is commanded closed (plot 1115), the FTIV is commanded open (plot 1120), and the vacuum pump is commanded on (plot 1110). Accordingly, pressure in both the evaporative emissions system (plot 1125), and fuel system (plot 1130) is reduced between time t1 and t2.

At time t2, pressure in the fuel system and evaporative emissions system reaches the variable vacuum target (represented by line 1128 and 1133). With the variable vacuum target reached, the vacuum pump is commanded off (plot 1110), the FTIV is commanded closed (plot 1120), and the CVV is maintained closed. In this way, the fuel system is sealed from atmosphere and from the evaporative emissions system, and the evaporative emissions system is further sealed from atmosphere.

Accordingly, between time t2 and t3, pressure bleed-up is monitored for the fuel system (plot 1130) and evaporative emissions system (plot 1125), independently. At time t3, two events occur. First, pressure in the evaporative emissions system reaches the pressure bleed-up threshold (line 1129). Accordingly, undesired evaporative emissions are indicated as stemming from the evaporative emissions system (plot 1145). The result is stored at the controller. Additionally, a pressure disturbance (e.g. fuel slosh event) is indicated for the fuel system. Accordingly, the fuel system pressure bleed-up threshold represented by line 1134 is dynamically adjusted to the fuel system pressure bleed-up threshold represented by line 1135. Such a dynamic adjustment of the fuel system pressure bleed-up threshold is not also conducted for the evap system pressure bleed-up threshold, as a fuel slosh event is not expected to influence bleed-up in the evaporative emissions system as it is sealed from the fuel system.

With the fuel system pressure bleed-up threshold adjusted, fuel system pressure is again monitored between time t3 and t4. At time t4, it may be understood that a predetermined time duration for conducting the test elapses. As pressure in the fuel system did not reach the dynamically adjusted fuel system pressure bleed-up threshold (line 1135), undesired evaporative emissions are not indicated for the fuel system (plot 1140). The results are stored at the controller.

With the results of the diagnostic obtained at time t4, conditions are no longer indicated to be met for conducting the test (plot 1105). Accordingly, the CVV (plot 1115) and the FTIV (plot 1120) are commanded open, and thus between time t4 and t5, pressure in the fuel system and evaporative emissions system return to atmospheric pressure. At time t5, the fuel system is sealed via closing the FTIV. Between time t5 and t6, pressure in the fuel system remains near atmospheric pressure, as does pressure in the evaporative emissions system.

Thus, by conducting the evaporative emissions test diagnostic simultaneously and independently for both the fuel system and evaporative emissions system, a source of undesired evaporative emissions may be pinpointed as to being from the fuel system, or the evaporative emissions system. Such pinpointing of the source may reduce time spent on labor, and may thus reduce costs passed on to the customer. Furthermore, by dynamically adjusting the pressure bleed-up threshold for the fuel system independent of the evaporative emissions system, a correct interpretation of the test diagnostic on the fuel system and evaporative emissions system may be ascertained. More specifically, if the pressure bleed-up threshold were not adjusted for the fuel system, the fuel slosh event would have pushed the pressure in the fuel system past the pressure bleed-up threshold represented by line 1134, and thus undesired evaporative emissions would have been indicated when, in fact, the fuel system is free from undesired evaporative emissions.

While the timeline 1100 depicts a fuel slosh circumstance, there may be other examples where the pressure bleed-up thresholds for the fuel system and evaporative emissions system may differ, may be adjusted for the fuel system but not the evaporative emissions system, or may be differentially adjusted for both. For example, in a situation where an altitude change is indicated to occur during the pressure bleed-up portion of the test diagnostic, both the fuel system and the evaporative emissions system pressure bleed-up thresholds may be adjusted, as a function of the altitude change, as both systems may be susceptible to the altitude change complicating interpretation of the test results. In such an example however, because the fuel system contains liquid fuel whereas the evaporative emissions system does not, the bleed-up thresholds may be dynamically adjusted by differing amounts.

In this way, in response to conditions occurring during a pressure bleed-up portion of an evaporative emissions test diagnostic that may adversely impact interpretation of the results of such a diagnostic, pressure bleed-up threshold(s) may be adjusted such that the results may be correctly interpreted. This may improve completion rates for such a test, as other methods may simply abort the diagnostic under such conditions.

The technical effect is to recognize that such thresholds may be adjusted under conditions where there is sufficient signal-to-noise to enable such an adjustment. Thus a technical effect is to recognize that by drawing a variable vacuum on the fuel system and evaporative emissions system as a function of learned/predicted disturbances to the pressure bleed-up portion of the test, signal-to-noise may be increased to a point where adjusting the pressure bleed-up thresholds is enabled. A still further technical effect is to recognize that, in some examples the fuel system may be independently and simultaneously diagnosed, where pressure bleed-up thresholds may be independently adjusted depending on the circumstances that occur during the pressure bleed-up portion of the test diagnostic.

The systems described herein, and with reference to FIGS. 1-2, along with the methods described herein, and with reference to FIG. 3 and FIGS. 5-6, may enable one or more systems and one or more methods. In one example, a method comprises conducting a diagnostic via evacuating a vehicle fuel system to a target vacuum, then sealing the fuel system from atmosphere and monitoring a pressure bleed-up in the fuel system; and dynamically adjusting a pressure bleed-up threshold responsive to one or more conditions that impact the pressure bleed-up during the diagnostic, and indicating undesired evaporative emissions responsive to the pressure bleed-up reaching the adjusted pressure bleed-up threshold. In a first example of the method, the method further comprises a controller to conduct the diagnostic and the dynamic adjustment of the pressure bleed-up threshold, and prior to conducting the diagnostic, learning via the controller the one or more conditions that impact the pressure bleed-up. A second example of the method optionally includes the first example, and further includes wherein learning the one or more conditions that impact the pressure bleed-up include learning a reid vapor pressure of fuel stored in the fuel system. A third example of the method optionally includes any one or more or each of the first and second examples, and further includes wherein learning the one or more conditions that impact the pressure bleed-up further comprises learning routes commonly traveled via the vehicle; and wherein the one or more conditions include fuel slosh events in the fuel system and/or altitude changes greater than a threshold altitude change along routes commonly traveled via the vehicle. A fourth example of the method optionally includes any one or more or each of the first through third examples, and further includes wherein the target vacuum is a variable target vacuum, variable as a function of the one or more conditions that impact the pressure bleed-up. A fifth example of the method optionally includes any one or more each of the first through fourth examples, and further includes wherein the target vacuum is further a function of one or more of ambient temperature, a fuel level of fuel stored in a fuel tank of the fuel system, and/or a loading state of a fuel vapor storage canister that traps and stores fuel vapors stemming from the fuel system. A sixth example of the method optionally includes any one or more or each of the first through fifth examples, and further includes wherein evacuating the fuel system to the target vacuum further comprises evacuating an evaporative emissions system to the target vacuum, the evaporative emissions system selectively fluidically coupled to the fuel system; and where sealing the fuel system from atmosphere and monitoring the pressure bleed-up further includes sealing the evaporative emissions system from atmosphere, monitoring pressure bleed-up in the fuel system and evaporative emissions system, and indicating undesired evaporative emissions responsive to the pressure bleed-up reaching the pressure bleed-up threshold. A seventh example of the method optionally includes any one or more or each of the first through sixth examples, and further comprises sealing the fuel system from the evaporative emissions system upon sealing the fuel system and the evaporative emissions system from atmosphere, wherein monitoring the pressure bleed-up includes monitoring a fuel system pressure bleed-up and an evaporative emissions system pressure bleed-up independently of each other, and wherein indicating undesired evaporative emissions includes indicating a presence or absence of undesired evaporative emissions independently for the fuel system and for the evaporative emissions system. An eighth example of the method optionally includes any one or more or each of the first through seventh examples, and further includes wherein the pressure bleed-up threshold is dynamically adjusted independently for the fuel system and the evaporative emissions system. A ninth example of the method optionally includes any one or more or each of the first through eighth examples, and further includes wherein the one or more conditions include a sudden pressure decrease while monitoring the pressure bleed-up, where the sudden pressure decrease corresponds to the fuel system being rapidly cooled.

Another example of a method comprises conducting a test diagnostic via evacuating a fuel system and an evaporative emissions system of a vehicle to a variable vacuum target, then sealing the fuel system and the evaporative emissions system from atmosphere and monitoring a pressure bleed-up in the fuel system and the evaporative emissions system and indicating a presence of undesired evaporative emissions stemming from the fuel system and/or evaporative emissions system in response to the pressure bleed-up reaching or exceeding a pressure bleed-up threshold, where the pressure bleed-up threshold is dynamically adjusted in response to an indication of one or more conditions that impact the pressure bleed-up. In a first example of the method, the method further comprises prior to conducting the test diagnostic, learning via a controller routes commonly traveled by the vehicle in order to determine the one or more conditions that impact the pressure bleed-up; wherein the one or more conditions that impact the pressure bleed-up comprise one or more learned events including fuel slosh events and/or altitude changes; and wherein dynamically adjusting the pressure bleed-up threshold includes adjusting the pressure bleed-up threshold as a function of the one or more learned events, and wherein the variable vacuum target is further a function of the one or more learned events. A second example of the method optionally includes the first example, and further comprises at a time prior to and within a threshold duration of conducting the test diagnostic, with the vehicle stationary, venting the fuel system and then sealing the fuel system and monitoring pressure in the sealed fuel system for a predetermined duration, in order to determine a reid vapor pressure of a fuel stored in the fuel system; and where dynamically adjusting the pressure bleed-up threshold includes adjusting the pressure bleed-up threshold as a function of the reid vapor pressure of the fuel stored in the fuel system, and where the variable vacuum target is further a function of the reid vapor pressure of the fuel stored in the fuel system. A third example of the method optionally includes any one or more or each of the first through second examples, and further includes wherein dynamically adjusting the pressure bleed-up threshold includes adjusting the pressure bleed-up threshold in response to a sudden drop in pressure in the fuel system and/or evaporative emissions system during the pressure bleed-up. A fourth example of the method optionally includes any one or more or each of the first through third examples, and further includes wherein sealing the fuel system and the evaporative emissions system from atmosphere and monitoring the pressure bleed-up in the fuel system and the evaporative emissions system includes monitoring a single pressure bleed-up under conditions where the fuel system is fluidically coupled to the evaporative emissions system upon sealing the fuel system and evaporative emissions system, and where dynamically adjusting the pressure bleed-up threshold includes dynamically adjusting a single pressure bleed-up threshold; and wherein sealing the fuel system and the evaporative emissions system from atmosphere and monitoring the pressure bleed-up in the fuel system and the evaporative emissions system includes monitoring two separate pressure bleed-ups including a fuel system pressure bleed-up and an evaporative emissions system pressure bleed-up, and where dynamically adjusting the pressure bleed-up threshold includes dynamically adjusting a fuel system pressure bleed-up threshold independently of an evaporative emissions system pressure bleed-up threshold, where each pressure bleed-up threshold is a function of the one or more conditions.

A system for a hybrid vehicle comprises a fuel system including a steel fuel tank for storing fuel; an evaporative emissions system including a fuel vapor canister, the evaporative emissions system selectively fluidically coupled to the fuel system via a fuel tank isolation valve; a vent line stemming from the fuel vapor canister, the vent line including a canister vent valve configured to selectively fluidically couple the fuel vapor canister to atmosphere; an engine, an intake of the engine selectively fluidically coupled to the evaporative emissions system via a canister purge valve; a fuel tank pressure transducer positioned in the fuel system; a vacuum pump positioned in a vacuum pump conduit in parallel with the vent line; a first check valve positioned in the vacuum pump conduit between the vacuum pump and the vent line downstream of the canister vent valve; a second check valve positioned in the vacuum pump conduit between the vacuum pump and the vent line upstream of the canister vent valve; and a controller storing instructions in non-transitory memory that, when executed, cause the controller to: conduct a diagnostic for a presence or an absence of undesired evaporative emissions stemming from the fuel system and/or evaporative emissions system by drawing a target vacuum on the fuel system and evaporative emissions system via the vacuum pump, where drawing the target vacuum includes commanding closed the canister vent valve, commanding closed the canister purge valve, commanding open the fuel tank isolation valve and activating the vacuum pump in a vacuum-mode of operation; and responsive to the target vacuum being reached, sealing the fuel system and the evaporative emissions system from atmosphere via deactivating the vacuum pump, monitoring a pressure bleed-up in the fuel system and the evaporative emissions system via the fuel tank pressure transducer and indicating a presence of undesired evaporative emissions stemming from the fuel system and/or the evaporative emissions system responsive to the pressure bleed-up reaching a pressure bleed-up threshold, where the pressure bleed-up threshold is dynamically adjusted as a function of one or more conditions encountered during the diagnostic that impact the pressure bleed-up. In a first example of the system, the system further comprises an onboard navigation system and/or a barometric pressure sensor; a fuel level sensor positioned in the steel fuel tank; wherein the controller stores further instructions to learn one or more routes commonly traveled via the vehicle, including learned altitude changes via the onboard navigation system and/or the barometric pressure sensor and learned fuel slosh events via the fuel level sensor along the one or more routes; and wherein the target vacuum is a variable target vacuum based on whether a learned altitude change and/or one or more fuel slosh events are predicted to occur during the pressure bleed-up in the fuel system and the evaporative emissions system. A second example of the system optionally includes the first example, and further includes wherein the controller stores further instructions to indicate a loading state of the fuel vapor canister and a volatility of fuel stored in the steel fuel tank; and wherein the variable target vacuum is further a function of the loading state of the fuel vapor canister and the volatility of fuel stored in the steel fuel tank. A third example of the system optionally includes any one or more or each of the first and second examples, and further comprises a pressure sensor positioned in the evaporative emissions system; wherein the controller stores further instructions to seal the fuel system from the evaporative emissions system via commanding closed the fuel tank isolation valve when sealing the fuel system and the evaporative emissions system; wherein monitoring the pressure bleed-up in the fuel system and the evaporative emissions system includes monitoring a fuel system pressure bleed-up via the fuel tank pressure transducer and monitoring an evaporative emissions system pressure bleed-up via the pressure sensor positioned in the evaporative emissions system; and wherein the pressure bleed-up threshold comprises a fuel system pressure bleed-up threshold and an evaporative emissions system pressure bleed-up threshold. A fourth example of the system optionally includes any one or more or each of the first through third examples, and further includes wherein the controller stores further instructions to dynamically adjust the fuel system pressure bleed-up threshold and the evaporative emissions system pressure bleed-up threshold independently of one another, responsive to the one or more conditions encountered during the diagnostic.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
conducting a test diagnostic via evacuating a fuel system and an evaporative emissions system of a vehicle to a variable vacuum target, then, once at the variable vacuum target, sealing the fuel system and the evaporative emissions system from atmosphere and monitoring a pressure bleed-up in the fuel system and the evaporative emissions system and indicating a presence of undesired evaporative emissions stemming from the fuel system and/or the evaporative emissions system in response to the pressure bleed-up reaching or exceeding a pressure bleed-up threshold, wherein the pressure bleed-up threshold is dynamically adjusted in response to an indication of one or more conditions that impact the pressure bleed-up, and wherein the variable vacuum target is determined, before the pressure bleed-up, as a function of one or more of ambient temperature, a fuel level of fuel stored in a fuel tank of the fuel system, and/or a loading state of a fuel vapor storage canister that traps and stores fuel vapors stemming from the fuel system, wherein sealing the fuel system and the evaporative emissions system from atmosphere and monitoring the pressure bleed-up in the fuel system and the evaporative emissions system includes monitoring two separate pressure bleed-ups including a fuel system pressure bleed-up and an evaporative emissions system pressure bleed-up, wherein dynamically adjusting the pressure bleed-up threshold includes dynamically adjusting a fuel system pressure bleed-up threshold independently of an evaporative emissions system pressure bleed-up threshold, and wherein indicating the presence of undesired evaporative emissions stemming from the fuel system and/or the evaporative emissions system in response to the pressure bleed-up reaching or exceeding the pressure bleed-up threshold comprises indicating the presence of undesired evaporative emissions stemming from the evaporative emissions system in response to the evaporative emissions system pressure bleed-up reaching or exceeding the evaporative emissions system pressure bleed-up threshold, and indicating the presence of undesired evaporative emissions stemming from the fuel system in response to the fuel system pressure bleed-up reaching or exceeding the fuel system pressure bleed-up threshold.

2. The method of claim 1, wherein dynamically adjusting the pressure bleed-up threshold includes adjusting the pressure bleed-up threshold in response to a sudden drop in pressure in the fuel system and/or the evaporative emissions system d u ring the pressure bleed-up, the pressure bleed-up threshold adjusted to a level more negative than a previous pressure bleed-up threshold, and wherein the fuel system is fluidically coupled to the evaporative emissions system upon sealing the fuel system and the evaporative emissions system.

3. The method of claim 2, further comprising, prior to conducting the test diagnostic, learning via a controller routes commonly traveled by the vehicle in order to determine the one or more conditions that impact the pressure bleed-up;
wherein the one or more conditions that impact the pressure bleed-up comprise one or more learned events including fuel slosh events and/or altitude changes; and
wherein dynamically adjusting the pressure bleed-up threshold further includes adjusting the pressure bleed-up threshold as a function of the one or more learned events, and wherein the variable vacuum target is further a function of the one or more learned events.

4. The method of claim 2, further comprising, at a time prior to and with in a threshold duration of conducting the test diagnostic, with the vehicle stationary, venting the fuel system and then sealing the fuel system and monitoring pressure in the sealed fuel system for a predetermined duration, in order to determine a reid vapor pressure of a fuel stored in the fuel system; and
wherein dynamically adjusting the pressure bleed-up threshold includes adjusting the pressure bleed-up threshold as a function of the reid vapor pressure of the fuel stored in the fuel system, and wherein the variable vacuum target is further a function of the reid vapor pressure of the fuel stored in the fuel system.

5. The method of claim 1, wherein sealing the fuel system and the evaporative emissions system from atmosphere and monitoring the pressure bleed-up in the fuel system and the evaporative emissions system includes monitoring a single pressure bleed-up under conditions where the fuel system is fluidically coupled to the evaporative emissions system upon sealing the fuel system and the evaporative emissions system, and wherein dynamically adjusting the pressure bleed-up threshold includes dynamically adjusting a single pressure bleed-up threshold; and
where each pressure bleed-up threshold is a function of the one or more conditions.

6. The method of claim 1, wherein the variable vacuum target is determined based on a route the vehicle is travelling including learned conditions including a fuel slosh event.

7. The method of claim 6, wherein the variable vacuum target is further determined based when the one or more fuel slosh events are predicted to occur during the pressure bleed-up.

8. The method of claim 7, wherein the variable vacuum target is determined based on a number of fuel slosh events predicted to occur during the pressure bleed-up.

9. The method of claim 1, wherein the variable vacuum target is determined based on a predicted altitude change on a route the vehicle is traveling.

10. The method of claim 9, wherein the predicted altitude change is predicted to occur during the pressure bleed-up, and the variable target vacuum is increased as the altitude change increases.

11. The method of claim 1, wherein the variable vacuum target is determined independent from a predicted altitude change on a route the vehicle is traveling, the predicted altitude change comprising a decrease in altitude.

\* \* \* \* \*